United States Patent

Kuroda et al.

[11] Patent Number: 5,759,647
[45] Date of Patent: Jun. 2, 1998

[54] TUBULAR ARTICLE METHOD FOR INJECTION MOLDING THEREOF

[75] Inventors: Rikio Kuroda, Sagamihara; Sadahiro Nishimura; Akio Hashimoto, both of Kawasaki, all of Japan

[73] Assignee: Nippon Petrochemicals Co., Ltd., Tokyo, Japan

[21] Appl. No.: 367,140

[22] PCT Filed: Apr. 28, 1994

[86] PCT No.: PCT/JP94/00724

§ 371 Date: Dec. 27, 1994

§ 102(e) Date: Dec. 27, 1994

[87] PCT Pub. No.: WO94/25243

PCT Pub. Date: Nov. 10, 1994

[30] Foreign Application Priority Data

Apr. 28, 1993 [JP] Japan ................. 5-123176
Sep. 6, 1993 [JP] Japan ................. 5-243570
Mar. 7, 1994 [JP] Japan ................. 6-059798

[51] Int. Cl.$^6$ ................. B29C 45/07; F16L 9/12
[52] U.S. Cl. ................. 428/34.5; 428/34.6; 428/34.7; 428/36.4; 428/35.8; 428/36.9; 428/36.91; 428/337; 428/1; 138/DIG. 7; 425/577; 264/328.7; 264/328.8; 74/640; 301/124.1
[58] Field of Search ................. 264/328.7, 328.8; 425/577; 428/35.7, 35.8, 36.9, 36.91, 328, 447, 34.5, 34.6, 34.7, 36.4, 480, 458, 340, 337, 339, 1; 138/DIG. 7, DIG. 11

[56] References Cited

U.S. PATENT DOCUMENTS

| | | | |
|---|---|---|---|
| 3,947,203 | 3/1976 | Rose | 264/328.7 |
| 3,992,503 | 11/1976 | Henfrey et al. | 264/167 |
| 4,005,166 | 1/1977 | Quick | 264/328.7 |
| 4,149,695 | 4/1979 | Quick et al. | 264/328.7 |
| 4,447,492 | 5/1984 | McKaveney | 428/328 |
| 5,160,466 | 11/1992 | Allan et al. | 264/328.8 |

FOREIGN PATENT DOCUMENTS

| | | |
|---|---|---|
| 0183278 | 6/1986 | European Pat. Off. . |
| 948767 | 8/1949 | France . |
| 2311650 | 12/1976 | France . |
| 3303756 | 3/1984 | Germany . |
| 388662 | 3/1933 | United Kingdom . |

OTHER PUBLICATIONS

Patent Abstracts of Japan: vol. 011, No. 350 (P–637) Nov. 17, 1987 & JP–A–62 128083 ( Sony Corp.) Jun. 10, 1987.
*Injection molding Handbook, The Complete molding Operation Technology, Performance, Economics*; Van Nostrand Reinhold Co. New York, Jan. 11, 1988.

*Primary Examiner*—Rena Dye
*Attorney, Agent, or Firm*—Bucknam and Archer

[57] ABSTRACT

A long tubular article characterized by having a smooth surface and a substantially uniform wall thickness in the circumferential direction and the longitudinal direction and by being produced by injection molding a thermoplastic resin and a method for the injection molding.

15 Claims, 15 Drawing Sheets

5,759,647

TUBULAR ARTICLE METHOD FOR INJECTION MOLDING THEREOF

TECHNICAL FIELD

This invention relates to a long tubular article made of a thermotropic liquid crystal resin, having a substantially uniform wall thickness, and serving advantageously in the field of electric and electronic parts, automobile parts, and machine parts and a method for the injection molding thereof. The term "long" used herein specifically means the fact that the ratio of the length (L) to the diameter (D) equivalent to cross section (hereinafter referred to as "equivalent diameter"), L/D, of the tubular article under consideration is not less than 2 and the term "equivalent diameter (D)" means the outside diameter of the circle of the tubular article when this tubular article is a cylindrical article having a circular cross section. When the tubular article has a triangular, tetragonal, or other similar angular cross section instead of a circular cross section, the equivalent diameter (D) is represented by the following formula:

$$D=4S/A$$

wherein S stands for the cross-sectional area defined by the outer sides of the tubular article and A for the peripheral length of the outer sides of the tubular article.

BACKGROUND ART

The tubular articles, particularly such long tubular articles as rolls and pipes (hereinafter referred to simply as "tubular article"), which are made of synthetic resins are now used in various fields. Most of them are formed by the method of extrusion. In recent years, the desirability of producing rolls in such office machines as copying devices and printers and pipes for machine parts in decreased weights has been finding enthusiastic recognition and the demands for tubular articles made of synthetic resins and enjoying high dimensional accuracy are growing.

The extrusion molding, however, does not easily achieve such dimensions as thickness and diameter with high accuracy. It is proper to adopt the injection molding method for the sake of high dimensional accuracy. The injection molding method, however, entails the following problems.

The ordinary injection molding machine uses an ejector pin for releasing a product from the mold and this ejector pin operates in the same direction as the direction of motion of the mold clamping mechanism of the machine. The direction in which the tubular article is disposed inside the mold, therefore, must be such that the direction of the central axis of this tubular article may coincide with the direction of motion of the mold clamping mechanism. Since it is desired that the size of the injection molding machine be proportionate to the size of the formed product thereof, the possibility that a tubular article formed by the injection molding machine will not be released from the mold owing to the limit of the transferring distance of the mold clamping mechanism which is undeniable.

When a tubular article having such a large L/D ratio as mentioned above is to be injection molded, it is desirable that the direction of the central axis of the tubular article be perpendicular to the direction of motion of the mold clamping mechanism.

The perpendicular relation of these two directions is at an economic disadvantage in complicating the mechanism for retaining a columnar member (drape mold) shaping the inner surface of the tubular article and the direction of release of the tubular article from the mold, though the central axis in this case may lie in a horizontal or a vertical direction or in a direction intermediate therebetween. To solve this problem, the idea has been conceived of using a method of injection molding which comprises shaping the columnar member (drape mold) shaping the inner surface of the tubular article in a structure releasable from the mold proper, injection molding a resin through a gate provided at one end in the longitudinal direction of the mold, removing the tubular article still mounting to the columnar member from the mold after the injection molding, and subsequently separating the columnar member and the injection molded tubular article in a separate process.

As a result, the injection molded tubular article to be produced by this method acquires veritable dimensional accuracy. In this case, however, since the columnar member and the mold proper are not integrated so fast as to form a one-piece entity, namely they are not thoroughly fixed to each other, the possibility may ensue that the columnar member will be moved by the pressure of the molten resin flowing into the mold cavity during the course of injection and the produced tubular article will consequently fail to acquire the desirable dimensional accuracy. In this case, therefore, the desirability of developing a method of injection molding capable of forming tubular articles with further improved dimensional accuracy has been finding wide recognition.

Besides, in association with the mold to be use in the conventional injection molding of the type described above, a method which comprises injecting molten resin through an inlet hole (gate) 2 provided in the middle point of a tubular cavity 1 as illustrated in FIG. 1 (a) and (b) may be remarked. In the diagrams, FIG. 1 (b) represents a cross section taken through FIG. 1 (a) along the line X–X'. This method, however, is at a disadvantage in giving rise to a so-called weld line at the site behind the gate at which parted flows of the molten resin join and consequently causing the produced tubular article to acquire degraded mechanical strength in the part of the weld line as compared with the other parts.

For the purpose of precluding the occurrence of the weld line, a method of injection molding which comprises using a so-called disk gate, i.e. a gate 2 which is formed throughout the entire circumference of a tubular cavity 1 as illustrated in FIG. 2 (a) and (b) has been proposed. Indeed, this method can preclude the occurrence of the weld line. When the molten resin to be injected into the mold happens to be a material which is liable to be oriented in the direction of flow thereof, however, the resin is evenly oriented in the direction of injection in the disk gate and, therefore, the produced tubular article sustains a mechanical drawback of being readily torn in the direction of flow of the molten resin. A tubular article which is obtained by injecting the molten resin through the disk gate from one end of the columnar cavity, for example, tends to break in a longitudinal direction like a bamboo.

This trend manifests conspicuously in a thermoplastic resin composition which, in spite of the use of a resin inherently difficult of orientation, is rendered by the incorporation therein of a fibrous or an acicular filler susceptible to the influence of the orientation of the filler or in such a resin easy of orientation in the direction of flow while in a molten state as the so-called thermotropic liquid crystal resin which is easily oriented while in a molten state or the composition of the resin.

SUMMARY OF THE INVENTION

An object of the invention is to solve these problems attendant on the prior art and provide a long tubular article substantially uniform in wall thickness and formable with high dimensional accuracy and a method for the injection molding thereof.

The present inventors made various studies concerning a tubular article in association with the true state of prior art mentioned above and, as a result, found that the aforementioned problems are solved by using a thermotropic liquid crystal resin as synthetic resin and causing a retainer member slidable inside a cavity shaping the tubular article in the forming mold to be fit in a columnar member shaping the inner surface of the tubular member, and forming the introduced molten resin while enabling the retainer member to be moved by the molten resin in motion or injecting the molten resin through the gate positioned at one end of the tubular cavity at an angle of not less than 5 relative to the direction of length of the tubular cavity. This invention has been perfected based on these findings.

Specifically, the tubular article of this invention is characterized by having a smooth surface and a substantially uniform wall thickness in the circumferential direction and the longitudinal direction and by being produced by injection molding a thermoplastic resin.

The tubular article of this invention is characterized further by exhibiting a spiral cross section at least in the neighborhood of a gate and by being produced by injection molding a thermoplastic resin. When this tubular article is made to sustain a fracture by a suitable impact fracture method such as, for example, a falling dart impact test, the fracture face consequently produced shows a spiral fracture line. This spiral pattern is found particularly conspicuously in the neighborhood of the gate.

Now, this invention will be described in detail below with reference to a drawing.

FIG. 3 is a perspective view illustrating one example of a tubular article 3 made of a thermotropic liquid crystal polyester resin according to this invention.

The tubular article of this invention is long in shape. To be specific, it is required to have a L/D ratio of not less than 2 and a substantially uniform wall thickness both in the circumferential direction and the longitudinal direction. If the L/D ratio is less than 2, the produced tubular article will fail to fulfill its function. If the wall thickness is ununiform, the tubular article will sustain such defects as warp and distortion. The term "substantially" as used herein means that the tubular article is so uniform as to show no sign of such deformation. The L/D ratio should be not less than 5, preferably to be in the range of from 5 to 1000.

A method of injection molding is adopted for producing the tubular article of this invention. Various methods such as extrusion molding, blow molding, injection molding, and compression molding are available for forming articles of synthetic resins. For the purpose of integrally forming a tubular article with an article of section profile or producing a tubular article of high dimensional accuracy, it is not proper to use any other method than the injection molding.

The tubular article of this invention can be formed with a triangular or a tetragonal cross section besides a circular cross section. Basically, the tubular article with the triangular or the tetragonal cross section can be formed in the same manner as the tubular article with the circular cross section. It is not particularly limited by size. It can be formed in a small to a large size ranging in length (L) from about several cm to more than one meter. It can be further formed with a small to a large wall thickness ranging from less than one mm to several cm. The tubular article may be formed with both the opposite ends thereof opened or with either of the opposite ends closed. Further, the tubular article may be formed in a modified shape having a flange or a gear part fixed at each or either of the opposite ends thereof or round the shank thereof.

The article of a section profile to be integrally formed with the tubular article of this invention may be in various shapes which are represented by the shape of a gear part, the shape of a flange, or the shape of an axle.

A toothed part 4 functions to transmit motive force when the tubular article is put to use. Generally, it is attached to a terminal part of the tubular article 3 as illustrated in FIG. 4.

One or a plurality of flanges 5 are attached to a terminal part or a shank of the tubular article 3. The flanges 5 function as guides for a paper, a film, a sheet, or a belt when the tubular article is used in an OA machine. Though the flanges 5 generally have a circular perimeter as illustrated in FIG. 5, they are allowed to have an angular or an elliptic perimeter.

A shaft 6 is adapted to be fixed to an end part of the tubular article 1 as illustrated in FIG. 6 and is generally used as a drive shaft for imparting rotation to the tubular article. This particular item of section profile is unlike the two items remarked above because a plurality of shafts 6 cannot be integrally attached to the tubular article 1 because the tubular article 1 is produced by injection molding. In case it is desired that the tubular article 1 be provided at each end thereof with the shafts 6, the extra shaft will be separately formed and attached to the tubular article 1 by adhesion, fusion or mechanical means.

The synthetic resin to be used for this invention is not particularly limited so long as it is a thermoplastic synthetic resin. As concrete examples of the thermoplastic synthetic resin, polyolefin type resins such as polyethylene, polypropylene and polybutene, polystyrene type resins, polyvinyl chloride type resins, aliphatic polyamide type resins such as nylon 6 and nylon 66, aromatic polyamide type resins such as polyphthalamide, polycarbonate type resins, polyester type resins such as polyethylene terephthalate and polybutylene terephthalate, polyoxymethylene type resins, polyphenylene ether type resins, polyurethane type resins, polysulfone type resins, polyether sulfone type resins, polyphenylene sulfide type resins, polyketone type resins, thermotropic liquid crystal resins such as thermotropic liquid crystal polyester resin, polyallylate type resins, polyimide type resins, polyamideimide type resins, and fluorine type resins may be cited. An ideal thermoplastic resin has a melting point of not less than 160° C., preferably not less than 190° C., and excelling in resistance to heat and toughness. This is a thermoplastic resin which popularly passes as an engineering plastic. Concrete examples of the thermoplastic resin answering the remark include aliphatic polyamide type resins such as nylon 6 and nylon 66, aromatic polyamide type resins such as polyphthalamide, polycarbonate type resins, polyester type resins such as polyethylene terephthalate and polybutylene terephthalate, polyoxymethylene type resins, polyphenylene ether type resins, polyurethane type resins, polysulfone type resins, polyether sulfone type resins, polyphenylene sulfide type resins, polyketone type resins, thermotropic liquid crystal polyester resin, polyallylate type resins, polyimide type resins and polyamideimide type resins. To be used for the formation of a tubular article, the synthetic resin is required to excel in flowability. It is ideal to adopt a thermotropic liquid crystal resin, particularly a thermotropic liquid crystal polyester resin, which especially excels in flowability in a highly confined space such as a thin wall of a tube. The use of a thermotropic liquid crystal resin proves to be advantageous for the manufacture of formed articles intended as machine parts because the resin permits production of tubular articles of high dimensional accuracy.

The synthetic resins cited above may be used in the form of a combination of two or more members or a mixture with other polymer such as rubber. In this case, it is desired to use the combination or the mixture with a compatibilyser for the sake of exalting the compatibility of the components. It is also allowable to use these synthetic resins as chemically modified.

The thermotropic liquid crystal polymer in the present invention is a resin exhibiting an optical anisotropy in the molten state and a thermoplastic meltable polymer. This polymer exhibiting an optical anisotropy in the molten state has a property such that the molecular chains of the polymer have regular parallel arrangement in the molten state. The properties of the optically anisotropic melt phase can be confirmed by the conventional polarimetry utilizing crossed polarizers.

The thermotropic liquid crystal polymer is preferably a thermotropic liquid crystal polyester. This may be selected from among various liquid crystal polyesters and liquid crystal polyester imides, such as partially or wholly aromatic polyesters, polyester amides and polyester carbonates. The above polyesters comprehend any polymer having a plurality of ester bonds. Among them, aromatic polyesters are especially preferred.

The thermotropic liquid crystal polyesters for use in the present invention comprehend a polyester composed of a polymer chain of which a part is composed of a segment that can form an anisotropic melt phase while the remaining part is composed of a segment that cannot form an isotropic melt phase. They also comprehend a compound polymer prepared by compounding plural thermotropic liquid crystal polyesters.

Representative examples of the monomers for use in the formation of the thermotropic liquid crystal polyesters are:

(a) at least one member selected from aromatic dicarboxylic acids, (b) at least one member selected from aromatic hydroxycarboxylic acid compounds, (c) at least one member selected from aromatic diol compounds, (d) at least one member selected from aromatic dithiol ($d_1$), aromatic thiophenol ($d_2$) and aromatic thiol carboxylic acid ($d_3$) compounds, and (e) at least one member selected from aromatic hydroxyamine and aromatic diamine compounds.

In the polymerization, the monomers of the groups (a) through (e) above may be individually employed. However, in many cases, these are employed in combination, e.g., combinations of groups (a) and (c), groups (a) and (d), groups (a), (b) and (c), groups (a), (b) and (e), or groups (a), (b), (c) and (e).

Examples of the aromatic dicarboxylic acid compounds of the group (a) above are aromatic dicarboxylic acids such as terephthalic acid, 4,4'-diphenyldicarboxylic acid, 4,4'-triphenyl-dicarboxylic acid, 2,6-naphthalendicarboxylic acid, 1,4-naphthalendicarboxylic acid, 2,7-naphthalenedicarboxylic acid, diphenyl ether 4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether 3,3'-dicarboxylic acid, diphenoxyethane-3,3'-dicarboxylic acid, diphenylethane-3,3'-dicarboxylic acid and 1,6-naphthalenedicarboxylic acid; and products of substitution of the above aromatic dicarboxylic acids with an alkyl, an alkoxy or a halogen, such as chloroterephthalic acid, dichloroterephthalic acid, bromoterephthalic acid, methylterephthalic acid, dimethylterephthalic acid, ethylterephthalic acid, methoxyterephthalic acid and ethoxyterephthalic acid.

Examples of the aromatic hydroxycarboxylic acid compounds of the group (b) above are aromatic hydroxycarboxylic acids, such as 4-hydroxybenzoic acid, 3-hydroxybenzoic acid, 6-hydroxy-2-naphthoic acid and 6-hydroxy-1-naphthoic acid, and products of substitution of the above aromatic hydroxycarboxylic acids with an alkyl, an alkoxy or a halogen, such as 3-methyl-4-hydroxy-benzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid and 6-hydroxy-5,7-dichloro-2-naphthoic acid.

Examples of the aromatic diol compounds of the group (c) above are aromatic diols, such as 4,4'-dihydroxydiphenyl, 3,3'-dihydroxydiphenyl, 4,4'-dihydroxytriphenyl, hydroquinone, resorcinol, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis (4-hydroxyphenyl)-propane and bis(4-hydroxyphenyl) methane, and products of substitution of the above aromatic diols with an alkyl, an alkoxy or a halogen, such as chlorohydroquinone, methylhydroquinone, t-butylhydroquinone, phenylhydroquinone, methoxyhydroquinone, phenoxyhydroquirone, 4-chlororesorcinol and 4-methylresorcinol.

Examples of the aromatic dithiol compounds of the group ($d_1$) above are benzene-1,4-dithiol, benzene-1,3-dithiol, 2,6-naphthalene-dithiol and 2,7-naphthalene-dithiol.

Examples of the aromatic thiophenol compounds of the group ($d_2$) above are 4-mercaptophenol, 3-mercaptophenol and 6-mercaptophenol.

Examples of the aromatic thiol carboxylic acid compounds of the group ($d_3$) above are 4-mercaptobenzoic acid, 3-mercapto-benzoic acid, 6-mercapto-2-naphthoic acid and 7-mercapto-2-naphthoic acid.

Examples of the aromatic hydroxyamine and aromatic diamine compounds of the group (e) above are 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline) and 4,4'-diaminodiphenyl ether (oxydianiline).

The thermotropic liquid crystal polyesters for use in the present invention can be produced from the above monomers by the use of various esterification techniques including the melt acidolysis and slurry polymerization processes.

The molecular weights of thermotropic liquid crystal polyesters suitable for use in the present invention are each in the range of about 2000 to 200,000, preferably about 4000 to 100,000. The molecular weights of the above-mentioned compounds may be determined by various methods including one in which a compressed film is prepared and the terminal groups of the film are determined by infrared spectroscopy, and another in which GPC being the common measuring method is performed after the preparation of a solution of the compound.

Aromatic homo- or copolyesters each containing the monomer unit represented by the following general formula (1) as an essential component are preferred among the thermotropic liquid crystal polymers obtainable from the above monomers. It is preferred that this monomer unit be contained in each of the polymers in an amount of at least about 30% by mole. An amount of at least about 50% by mol is preferable.

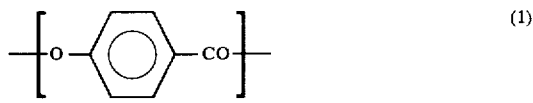
(1)

The aromatic polyester especially preferred for use in the present invention is one having the repeating units with structures respectively derived from three different compounds, i.e., p-hydroxybenzoic acid, phthalic acid and biphenol and represented by the following formula (2). In this polyester represented by the following formula (2), the repeating units each having a structure derived from biphenol may partially or wholly be replaced by the repeating units derived from dihydroxybenzene. Further, the aromatic polyester also especially preferred for use in the present invention is one having the repeating units with structures respectively derived from two different compounds, i.e., p-hydroxybenzoic acid and hydroxynaphthalenecarboxylic acid and represented by the following formula (3).

I)
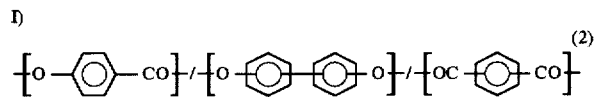
(2)

II)
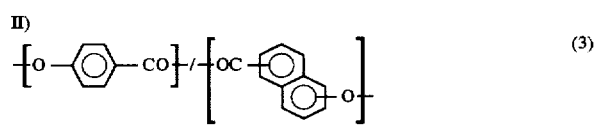
(3)

In the present invention, the thermotropic liquid crystal polymers may be used either individually or in combination.

The thermoplastic resin may incorporate therein various additives, depending on the intended use of the product.

The inorganic fillers which are available as such additives include silicates such as kaoline, clay, talc, mica (white mica and brown mica), vermiculite, highly dispersible silicic acid, calcium silicate, feldspar powder, acid clay, agalmatolite clay, silica sand, sericite, sillimanite, bentonite, glass flakes, glass powder, glass beads, slate powder and silane, glass fibers, carbon fibers, metal fibers, ceramic fibers, boron fibers, barium titanate, calcium carbonate, calcium sulfate, magnesium hydroxide, silica, alumina, barium sulfate, barium carbonate, magnesium carbonate, dolomite, titanium dioxide, zinc oxide, iron oxide, ferrite, molybdenum sulfide, pearlite powder, plaster of Paris, hydrated alumina, alumina, antimony oxide, magnesium oxide, titanium dioxide, zinc oxide, amorphous silica, quartz powder, flint quartz, silica sand, diatomaceous earth, white carbon, wallastonite, boron nitrite, silicon nitride, carbon black, graphite, wood flour, various species of whiskers, metal powder, and vitreous carbon, for example.

Among other inorganic fillers cited above, such inorganic fillers as glass fibers, carbon fibers, acicular calcium carbonate, acicular calcium sulfate, and various species of whiskers which have a fibrous or an acicular shape and, therefore, a high aspect ratio (numerical value obtained by dividing the length of a particle by the diameter thereof) prove to be particularly desirable. The aspect ratio is desired to be 5 or over, preferably to be 10 or over. This is because the effect of the incorporated inorganic filler in improving strength, modulus, dimensional accuracy and heat resistance increases in proportion as the aspect ratio increases.

These inorganic fillers may be used either singly or in the form of a mixture of two or more members. The practice of using such a surfactant as a coupling agent for the sake of improving the dispersibility of an inorganic filler in the synthetic resin or the physical properties of the inorganic filler is prevalent.

In this invention, the amount of an inorganic filler to be incorporated in the thermoplastic resin is desired to be in the range of from 5 to 80 parts by weight, based on 100 parts by weight of the synthetic resin. If this amount is less than 5 parts by weight, the possibility may arise that the added inorganic filler will not manifest the effect of improving strength, rigidity, dimensional accuracy and resistance to heat. If the amount exceeds 80 parts by weight, the possibility may ensue that the added inorganic filler will conspicuously impair the formability of the synthetic resin.

Besides, various stabilizers (antioxidant, UV absorber, light stabilizer, and metal inactivator), pigment, dye, plasticizer, oil, lubricant, nucleating agent, antistatic agent and flame retardant may be suitably used.

When the tubular article of this invention is used as integrated with a toothed wheel, a flange, or a shaft, the material thereof may be required to tolerate the impact possibly exerted thereon when the tubular article contacts or slides on other mechanical member. In this case, it is desired that the synthetic resin incorporate therein a slidability enhancer such as, for example, fillers mentioned above, particularly carbon fibers, talc, calcium sulfate and molybdenum sulfide or other synthetic resin such as, for example, a fluoro resin which lends itself to the improvement of the lubricating property. The amount of the slidability enhancer to be used is similar to that of the inorganic filler to be incorporated as remarked above.

This invention allows the tubular article made of this thermoplastic resin to be finished as a heating member. The tubular articles of this invention, when finished as a heating member, can be used in various heating cylinders such as, for example, a heating roll.

One method for obtaining the tubular article as a heating cylinder consists of preparing a composition comprising the aforementioned thermoplastic resin, various additives cited above, and an electroconductive filler and forming this composition in a cylindrical shape thereby enabling the produced tubular article to generate heat when electrified. The volume resistivity of this composition is required to be in the range of from $10^{-3}$ to $10^7$ $\Omega.cm$, preferably from $10^{-1}$ to $10^3$ $\Omega.cm$. If the volume resistivity deviates from this range, the produced tubular article cannot serve as an ideal heating member. The load deflection temperature of this composition measured in accordance with ASTM with necessary modifications is desired to be 110° C. under a load of 18.6 kg/cm$^2$.

The electroconductive filler to be used advantageously herein may be in the form of fibers, flakes or particles.

As concrete examples of the fibrous electroconductive filler, carbon fibers (PAN type and pitch type), metal fibers (soft steel, stainless steel, copper and alloys thereof, aluminum and alloys thereof and lead), metallized glass fibers (glass fibers coated with nickel, copper, aluminum and silver) and carbon fibers coated with nickel may be cited.

As concrete examples of the electroconductive filler in the form of flakes or fibers, various metal powders (iron, copper, aluminum, silver, gold, nickel, zinc, brass, lead and stainless steel), flakes of the same metals as mentioned above, various carbon powders (Ketjen black, SRF carbon, graphite, activated carbon, etc.), carbon microballoons and glass flakes coated with nickel, silver and copper may be cited.

The electroconductive filler which proves to be desirable herein is in the form of minute particles or flakes having particle diameters of not more than 150 µm or in the form of fibers having diameters of not more than 150 µm. More desirably, Ketjen black, acetylene black, carbon fibers, stainless steel (fibers, powder, flakes), aluminum (fibers, powder, flakes) having particles diameter or fiber diameters of not more than 100 µm are used either singly or in the form of a mixture of two or more members.

The amount of the electroconductive filler to be incorporated in the thermotropic resin is desired to be in the range of from 2 to 100 parts by weight, preferably from 5 to 60 parts by weight, based on 100 parts by weight of the resin. If this amount is less than 2 parts by weight, the produced tubular article will acquire an unduly high volume resistivity. If it exceeds 100 parts by weight, the composition will be prepared with difficulty and the produced tubular article will manifest only degraded mechanical properties.

Another method for obtaining the tubular articles of a thermoplastic resin in the form of a heating cylinder consists of coating the surface of the tubular article with an electroconductive film which generates heat when electrified. As concrete examples of the electroconductive film, coatings formed of Nichrome wires, Kanthal wires and ITO may be cited.

The tubular article of a thermoplastic resin according to this invention is obtained by injection molding such a thermoplastic resin as mentioned above or a composition having additives incorporated in the thermoplastic resin.

In this invention, the tubular article of a thermoplastic resin may be furnished on the surface thereof with a protective film of a silicone resin type coating material. The silicone resin type coating material is advantageously used when it shows resistance to heat of 300° C. or over. The thermotropic liquid crystal resin is generally stable chemically as remarked above. When a coating of other material is formed on the surface of the tubular article made of a thermotropic liquid crystal resin, therefore, no appreciably high chemical binding force can be expected to arise between the thermotropic liquid crystal resin and the coating. Hence, the possibility that the coating will peel off the tubular article is undeniable. It has been ascertained by the present inventors, however, that a silicone resin coat coating material tightly binds itself to the tubular article of the thermotropic liquid crystal resin.

The term "silicone resin coating material" as used herein means a coating material which has as a basis thereof the initial condensate of a silicone resin having organic groups linked to the silicon atoms of siloxane (Si—O—Si) as a backbone and which is produced by dissolving the basis in an organic solvent such as xylene. The organic groups mentioned above may be alkyl group, aryl group, alkenyl group, hydrogen atom, etc. Generally, they are methyl groups or phenyl groups. The resistance of the coating material to heat is improved more when the phenyl group content is larger than the methyl group. The modified silicone resins the modification of which is implemented with alkyd resin, epoxy resin, phenol resin, melamine resin, acryl resin and polyester resins by either utilizing or simply incorporating the functional group of silicone resin (such as silanol group or alkoxy group) are also embraced. In the case the coating material is required to possess still higher resistance to heat, it is desired to use as the basis therefor a pure silicone resin in the true sense of the word.

With respect to the manner of curing, the condensation, the addition of platinum or the polymerization of a peroxide is conceivable. Generally, the condensation is utilized. Such curing catalysts as naphthenates of cobalt, zinc, manganese and iron and amines are available. The silanol group (Si—OH) or the alkoxy group, on exposure to heat or catalysis, is dehydrated or condensed with release of alcohol to induce the formation of a siloxane bond and effect the curing consequently.

The silicone resin coating material acquires improved resistance to heat by incorporating therein a heatresistant pigment, aluminum powder, graphite, ceramic powder, etc. The amount of these additives to be incorporated is in the range of from 1 to 50% by weight, based on the amount of silicone resin. To serve advantageously in this invention, the silicone resin coating is required to incorporate therein such inorganic fillers as just mentioned.

The tubular article, when necessary, is subjected to such a pretreatment as degreasing prior to the application of the coating material. The pretreatment which is carried out in the same manner as the pretreatment normally given to any synthetic resin coating material suffices herein.

The method for forming the protective film of the silicone resin coating material specifically starts with the dilution of the silicone resin type coating material with a thinner or a lacquer as a diluent. The ratio of this dilution is in the range of from 30 to 45% in the case of the application with a spray or in the range of from 10 to 20% in the case of the application with a brush or a roller. The resultant diluted solution is applied to the surface of the tubular article of a thermotropic liquid crystal resin in a thickness in the range of from 5 to 50 µm, preferably from 10 to 25 µm, by the use of a spray, a brush or a roller. The applied layer of the solution is dried and cured at a temperature of about 20° C. and optionally baked at a temperature in the range of from 170° to 180° C. to impart improved durability and heightened chemical resistance to the tubular article.

The conventional synthetic resin coating materials, owing to their origination in organic substances, succumb to thermal decomposition and therefore are deficient in resistance to heat. The silicone resin coating material, however, is transformed into an inorganic coating when heated to an elevated temperature and, therefore, is rather capable of acquiring enhanced resistance to heat. The thermotropic liquid crystal resin excels other organic polymers in resistance to heat. The conventional synthetic resin coating materials do not tolerate the heat of such an elevated temperature as is endured by the thermotropic liquid crystal resin. When the silicon resin film is formed on the tubular article of the thermotropic liquid crystal resin, the silicone resin is partly or wholly transformed into an inorganic substance during the heating of the tubular article of the thermotropic liquid crystal resin to the elevated temperature and, as a result, the coating material acquires further enhanced resistance to heat.

A metallic coating may be applied to the outer surface of the tubular article of this invention. Various methods are available for the application of the metallic coating. To be specific, such methods as electroless plating (chemical plating), electrolytic plating, spattering, and vacuum evaporation are generally conceivable. Among other methods cited above, the electro plating method or the electroless plating method which forms a relatively strong coating is desirably used where the tubular article is intended for the aforementioned use which demands durability. The electrolytic plating method proves to be most desirable.

For the process of plating, any of the well-known plastic plating methods can be adopted. Generally, this process starts with subjecting the tubular article to a degreasing treatment using an organic solvent or a surfactant. Generally, this degreasing treatment is followed by an etching treatment using a concentrated aqueous solution of sodium hydroxide or sulfuric acid.

Then, the tubular article undergoes the processes of conditioning, addition of catalyst, and activation before the process of electroless plating. Thereafter, it is optionally subjected to the electrolytic plating. As a source metal for the electroless plating, copper, nickel, chromium, etc. are generally used. Where the tubular article is intended for a use which demands slidability, it is desirable to adopt nickel or chromium. Numerous metals are available for the electrolytic plating. As concrete examples of such metals, copper, nickel, chromium, gold, silver and tin-lead alloy may be cited. The thickness of the layer of plating metal to be formed by the plastic plating method is generally in the range of from 200 Å to 1000 µm.

The spattering method comprises applying such a high potential as not less than 10,000 volts, for example, between a cathode and an anode under a high degree of vacuum in the range of from $1 \times 10^{-3}$ to $2 \times 10^{-4}$ Torr to induce generation of a glow discharge thereby causing the metal of the cathode to be spattered, and enabling the spattered metal to deposit on the surface of the tubular article of the thermotropic liquid crystal resin and give rise to a metal coating. The practice of implementing the spattering method in the presence of such an inert gas as argon is also prevalent. Numerous metals are usable for the spattering method. Coatings of such metal oxides as tin oxide and indium oxide as well as those of copper, gold, chromium, and aluminum can be formed by the spatting method.

The vacuum evaporation method is known in two types, i.e. the vacuum deposition method and the chemical deposition method. The vacuum deposition method forms a metal coating on the surface of the tubular article as a substrate by heating a metallic substance to be deposited under a high degree of vacuum in the approximate range of from $1 \times 10^{-3}$ to $1 \times 10^{-4}$ Torr, for example, thereby enabling the vaporized metal to be deposited on the surface of the tubular article. Aluminum, for example, is used as the metal.

The chemical deposition method comprises vaporizing a metal or a metal oxide, introducing the vaporized metal or metal oxide into a reaction chamber, causing the vapor of metal or metal oxide to be deposited on the surface of the tubular article in a state approximating a thermodynamic equilibrium state thereby forming a coating of the metal or metal oxide. As concrete examples of the substance to be deposited, oxides such as silica and alumina, carbides such as silicon carbide, and nitrides such as silicon nitride besides such metals as boron may be cited.

Otherwise, the ion plating method which comprises causing vaporized particles of a mother material from an evaporation source to be ionized in a plasma under a high degree of vacuum thereby inducing deposition of the ionized vapor particles on the surface of the tubular article may be adopted. For the generation of the plasma, the DC excitation method resorting to the application of a DC electric field and the high-frequency excitation method relying on the application of a high-frequency electric field are conceivable. Either of these methods can be adopted for the ion plating method.

The coating which is formed by the spattering method, the vacuum evaporation method, the ion plating method, etc. generally has a thickness in the approximate range of from 200 Å to 1000 Å.

Now, the method of injection molding according to the present invention will be described below.

FIG. 7 represents a top view and a cross section of a mold to be used for forming a tubular article according to the present invention. As illustrated in FIG. 7, a molten resin introduced through a sprue 7 and a runner 8 from the injection unit of an injection molding machine flows through the gate 2 provided at one end in the longitudinal direction of the mold into the cavity 1 upwardly from the lower part of the cylinder and fills this cavity 1 upwardly.

Inside the mold, a columnar member 11 for shaping the inner surface of the tubular article is set in place.

The mold generally has a paired structure (comprising a stationary die 9 and a movable die 10 and occasionally having an intermediate plate interposed therebetween) which laterally parts relative to the center of the tubular article as the boundary. These dies severally have formed therein dents for shaping the outer surface of the tubular article. The stationary die 9, when necessary, may be adapted so as to serve as a movable member.

The possibility exists that the parting line across which the opposed faces of the two dies are joined will persist on the surface of the produced tubular article and impair the appearance thereof. As a measure to preclude this trouble, there may be adopted, for example, a method which comprises constructing the mold so as to have an auxiliary mold (cylindrical in shape) for shaping the outer surface of a columnar member set in place inside both the stationary die 9 and the movable die 10 and, after the injection, allowing the molded tubular article to be released together with the auxiliary mold from the mold proper, and separately extracting the auxiliary mold from the mold proper in conjunction with the columnar member 11 which has served the purpose of shaping the inner surface of the cylindrical member.

Optionally, the columnar member 11 may be integrally attached to the stationary die 9 or the movable die 10. In this case, however, the mold is set at a disadvantage in complicating its own structure and consuming time in the work of mold release because it must then be provided with a mechanism for extracting the produced tubular article. Desirably, the mold is so adapted that the columnar member 11 may be detachably fixed to the mold proper. By adapting the columnar member 11 to be detached from the mold proper instead of being fixed thereto, the molded tubular article 3 is capable of being released together with the columnar member 11 from the mold and the columnar member 11 is allowed to be subsequently extracted separately, with the result that the work of extracting the drape die will be facilitated.

In this case, however, it is difficult to fix the columnar member 11 firmly to the mold proper. Thus, the possibility that the columnar member 11 will be pushed out of place by the force of the incoming flow of the molten resin and the produced tubular article will acquire high dimensional accuracy with difficulty is undeniable.

To solve this problem, it is desirable to adopt a method which comprises fitting in the columnar member 11 for shaping the inner surface of the tubular article a retainer member 12 slidable in a cavity for shaping the tubular article 3 inside the mold and effecting the molding of the molten resin (thermoplastic resin) being introduced while allowing the retainer member 12 to be moved by the incoming flow of the molten resin.

Such a preferred method of injection molding according to this invention as described above is depicted in FIG. 8 which represents a schematic cross section. Since this retaining member 12 is effective in retaining the columnar member 11 fast inside the mold while the introduction of the molten resin is in process, the columnar member 11 will not be pushed out of place and the produced tubular article will acquire high dimensional accuracy. Since FIG. 8 represents an example of the cylindrical article, the retainer member 12 is depicted therein as assuming a circular cross section. In the case that the tubular article has a cross section other than a circle, the retainer member 12 which conforms to the cross section of the tubular article is used. The retainer member 12 fits so tightly in the columnar member 11 that the molten resin may not leak through the interface to be formed between the two members.

The molten resin injected through the gate normally fills the interior of the mold gradually while advancing in a state of fountain flow inside the mold. The front side of the fountain flow constitutes a melt front. This is the case of simply injecting the molten resin into the mold through the gate which is positioned at one terminal face of the mold adapted for injection molding.

When the retainer member 12 which functions to curb the formation of the melt front of a fountain flow is utilized as in the present invention, the molten resin fills the interior of the mold while repressing the formation of the melt front of a fountain flow. As a result, the tubular article 3 of this invention enjoys improvement in the roughness particularly of the surface thereof which contacts the mold. Regarding the operation of injection molding, it is often concluded hastily that the surface roughness of a formed article obtained by filling a mold with resin is equivalent to that of the mold. In actuality, however, the produced formed article acquires a very poor surface roughness, namely a much rougher surface, than the inner surface of the mold for diverse reasons conceivable. In view of this true state of prior art, a method of injection compression molding which comprises first injecting a molten resin and then compressing the injected resin into a stated shape before the resin solidifies has been proposed. Even by the method of injection compression molding, let alone by the conventional method of injection molding, a high melting thermoplastic resin, particularly a thermotropic liquid crystal resin, has not always produced a formed article possessing a surface roughness approximating the roughness of the inner surface of the mold.

By the adoption of the retainer member 12 according to the method of this invention, the produced tubular article 3 acquires an extremely smooth surface. In other words, the retainer member 12 permits production of a tubular article possessing a surface roughness substantially equivalent to the roughness of the inner surface of the mold. When the inner surface of the mold is vested with specular finish, for example, the tubular article formed by the method of this invention acquires a surface roughness, Rmax, of not more than 4 µm, preferably not more than 3 µm. Even with the mold of specular finish, the tubular article produced by the conventional method acquires a surface roughness of not less than 5 µm. The surface roughness under discussion is assumed to be determined by the use of a surface analyzer under the conditions of 1 µm of needle diameter, 0.3 mm/sec of scanning speed, and 0.07 g of load.

Incidentally, since the tubular article of this invention is a formed piece which has an extremely smooth surface, it is at an advantage that a varying coating member may be applied easily to the surface thereof and also that the coating consequently obtained thereon to acquire a similarly smooth surface. Further, the smooth surface of the tubular article lends itself to the increase of peel strength of the coating.

Though the position for setting the retainer member 12 is not particularly limited, it is desirable to dispose the retainer member 12 as closely to the gate 2 as possible for the purpose of ensuring production of a tubular article of high dimensional accuracy. The retainer member 12 may be fit manually to the columnar member 11. Optionally, this work of fitting the retainer member 12 may be automated by the use of a robot.

It is desired that retainer member 12 so fit to the columnar member 11 that it will offer slight resistance to the motion it is expected to produce while the molding is in process for the purpose of enabling the produced tubular article to acquire a smooth surface. This relationship between the resistance and the surface smoothness is particularly prominent when a thermotropic liquid crystal polyester resin is used as a synthetic resin. If the retainer member 12 is easily moved, a streak pattern appears on the surface of the product. When the retainer member is made to offer slight resistance to the motion of itself, therefore, the resin is allowed to fill the cavity of the mold while taking shape and the produced tubular article acquires a smooth surface. In this connection, it is necessary that the retainer member remain in tight contact with the columnar member and/or the mold (the stationary die and the movable die).

The retainer member 12 is generally made of resin or metal. The retainer member made of resin may be obtained, for example, by cutting a tubular article (pipe) formed by the method of this invention. This retainer member advantageously serves the purpose of offering appreciable slide resistance. This remark applies to the case in which the formed pipe released from the mold can be fit in the columnar member 11. When the produced tubular article contracts or expands, it cannot be used because it cannot fit smoothly in the columnar member 11. The thermotropic liquid crystal resin, preferably the thermotropic liquid crystal polyester resin, succumbs only sparingly to the shrinkage after molding and is characterized by permitting formation of a tubular article accurately conforming to the size of the mold. It is, therefore, desirable to cut a piece from a tubular article made of a thermotropic liquid crystal resin and use this piece as the retainer member.

The retainer member of metal may be made of the same material as the mold proper. This retainer member, however, has the possibility of inflicting scratches on the mold. Thus, it is desirable to produce the retainer member with a metal having lower hardness than the mold. As concrete examples of the material advantageously used for the retainer member, gunmetal, brass, copper, aluminum, and duralumin may be cited.

In order for the retainer member 12 made of metal to be fit tightly in the columnar member 11, it must be provided in the longitudinal direction thereof with grooves 13 as illustrated in FIG. 9 (a). The ease with which the retainer member 12 is closed gains in proportion as the grooves 13 lose in size and increase in number. To close the metallic retainer member 12, a circular spring 14 adapted to contract is inserted in a groove 9 provided in the lateral direction in the retainer member as illustrated in FIG. 9 (b) and (c). This insertion may be effected in the same manner as a rubber band is set round a solid object. Since this circular spring 14 is inserted in the groove 9, it offers no obstruction to the motion of the retainer member 14.

When the circular spring free to contract as described above is used, the retainer member is squeezed to a smaller diameter because it is provided in the longitudinal direction thereof with the grooves 13. As a result, the retainer member fits tightly in the columnar member 11 and moves while offering resistance.

Alternatively, a circular spring adapted to expand may be used in the place of the circular spring which contracts. When this spring is used, the retainer member 12 is made to expand radially to an increased diameter because it is provided in the longitudinal direction thereof with the grooves 13. As a result, the retainer member 12 is pressed against the stationary die 9 and the movable die 10 and is consequently moved as offering resistance.

The shape of the retainer member is only required to conform to the shape of the mold. The retainer member may be in a tubular shape or a cylindrical shape as illustrated in FIGS. 8 and 9, for example. It is moved by the flow of the molten resin introduced by injection without reference to the shape thereof.

The retainer member functions to curb the otherwise possible formation of a melt front as described above. It is, therefore, not always required to be adapted to be moved by the pressure of the resin in motion. It may be connected to a suitable moving device such as, for example, a hydraulic cylinder with which a proper adjustment enables the retainer member to be moved as synchronized with the speed of the flow of the molten resin.

For the formation of a tubular article provided with a flange, the mold to be used is required to be furnished with a slide mechanism which fulfills its part when the mold is opened. The method for injection molding the tubular article of this sort is shown in FIG. 10 which represents a schematic cross section illustrating the tubular article in process. As illustrated in FIG. 10, the molten resin introduced through the sprue 7 and the runner 8 from the injection unit of an injection molding machine flows through the gate 2 into the cylinder from below and fills the cavity upwardly. The columnar member 11 for shaping the inner surface of the tubular article (the cylindrical member 3 and the flange 5) is contained in the mold. The retainer member to be used during the formation of the tubular article provided with a flange is required to have a width greater than the width of the flange. If the width of the retainer member is smaller than the width of the flange, the possibility ensues that the retainer member will readily move in the flange part thereof when the retainer member is raised by the pressure of the resin and, as a result, the produced tubular article will fail to acquire high dimensional accuracy.

After the injection molding, the tubular article is obtained by moving the dies to be released together with the columnar member 11, removing the tubular article from the columnar member 11, and extracting the columnar member. When a thermotropic liquid crystal resin, particularly a thermotropic liquid crystal polyester resin, is used for the tubular article in this case, the extraction of the columnar member 11 is easily attained because the produced tubular article enjoys high dimensional accuracy.

FIG. 11 is a cross section illustrating with a model the mold to be used for this invention. The diagram shows the mold as posed in a closed state. As illustrated in the diagram, this mold is intended to be used for forming a pipe by injecting a synthetic resin material through the gate into the cavity 1 of the mold. It is, therefore, provided with a mold proper 16 having a seamless long cylindrical empty space 15 formed therein by drilling and used for shaping the outer surface of the pipe and the columnar member 11 defining the cavity 1 jointly with the mold proper 16 and forming the inner surface of the tubular article, with the gate 2 provided at the lower end of the cylindrical empty space 15. The mold is opened and closed from the lateral end part of the gate so as to allow extraction of the produced pipe from the cylindrical empty space 15.

The mold proper 16 is provided with the stationary part (die) 9, a lefthand moving part (die) 10 possessed of an empty space forming part 17 having the cylindrical empty space 15 formed therein and adapted to move in the lateral direction, a lower moving part 19 adapted to produce a motion in the lateral direction, close the lower end of the cavity 1, and support the columnar member 11 fast at a depressed part 18, and an upper moving part 20 adapted to produce a motion in the lateral direction and close the upper end of the cavity 1. The sprue 7 is provided in the stationary part 9, the runner 8 is formed between the stationary part 9 and the lefthand moving part 10 and the lower moving part 19, and the gate 2 is formed between the lefthand moving part 10 and the lower moving part 19. The lower moving part 19 is moved laterally by a piston cylinder unit 21 and fixed in place by a piston cylinder unit 22 while the molding is in process. The upper moving part 20 has of a hole 23 for allowing insertion and extraction of the columnar member 11 and a hole 24 for allowing insertion of a member for ejecting the produced pipe. These holes are moved laterally by a piston cylinder unit 25 so as to be positioned at the upper end of the cylindrical empty space 15. The columnar member 11 is vertically moved by a mechanism 26 so as to be inserted into and extracted from the cylindrical empty space 15.

Specifically, the injection molding in this construction is started with the motion of the lower moving part 19 toward the right to the stationary part 9 to effect fixation of this lower moving part 19 to the stationary part 9 with the piston cylinder unit 22. Now, the lefthand moving part 10 is moved toward the right and fixed to both the lower moving part 19 and the stationary part 9. Then, the upper moving part 20 is moved to position the hole 23 at the upper end of the cylindrical empty space 15 and allow the columnar member 11 to be inserted through the hole 23 into the cylindrical empty space 15, with the result that the lower end of the columnar member 11 will be fixed in the depressed part 18 and the upper end of the columnar member 11 will be fixed by the hole 23. Subsequently, the thermoplastic resin is injected through the sprue 7, the runner 8 and the gate 2 into the cavity 1 and solidified therein. Then, the columnar member 11 is extracted through the hole 23 and the lefthand moving part 10 is moved toward the left. Now, the piston cylinder unit 22 is moved downwardly and the lower moving part 19 is moved toward the left. As a result, the lower end of the solidified tubular article inside the cylindrical empty space 15 and the gate 2 part, the runner 8 part, and the sprue 7 part of the solidified thermoplastic resin are released. At this time, the tubular article and the solidified thermoplastic resin may fall under their own weights. Otherwise, the produced pipe may be discharged through the lower end of the cylindrical empty space 15 after moving the upper moving part 20 toward the left to position a hole 31 at the upper end of the cylindrical empty space 4 and inserting through the hole 24 the member for ejecting the produced pipe.

Owing to the operation described above, the produced pipe sustains no seam on the lateral surface thereof because at least the lateral part of the outer surface of the pipe is shaped by the seamless cylindrical empty space 15 formed by drilling and the cavity is not deformed during the process of molding. Thus, this operation always permits production of pipes having a fixed size throughout the entire direction of length. Further, the columnar member 11 is removed by extraction from the pipe after the pipe has been solidified inside the cavity and then the mold is opened to allow discharge of the pipe from the cylindrical empty space 15.

Thus, the removal of the columnar member 11 can be effected simply without requiring any extra step.

In the construction described above, the upper moving part 20 which keeps the upper end part of the cylindrical empty space 15 closed is movable, whereas the lefthand moving part 10 may be integrally fixed instead to the mold proper. In this case, the hole 24 is useless. The use of one gate as in the construction described above is not an essential condition for this invention. Optionally, two such gates may be symmetrically positioned, for example.

The fixation of the columnar member 11 is attained by the retainer member 12 which has an annular cross section substantially identical with the lateral cross section of the cavity 1 and which is inserted in the lower end of the cavity 1 before the injection of the thermoplastic molten resin and is subsequently moved upwardly by the injected resin.

When the pipe is required to have an adjusted length, the adjustment is attained by inserting in the cavity 1 a member possessing a cross section substantially identical with the lateral cross section of the cavity 1.

In the construction described above, the depressed part 18 is provided on the lower moving part 19. Optionally, this depressed part may be so formed as to be extended from the lower moving part 19 through the stationary part 9. In this case, the lower end part of the columnar member 11 can be fixed between the lower moving part 19 and the stationary part 9 by inserting the columnar member 11 in the depressed part 18 and then closing the lower moving part 19.

The other method of injection molding according to this invention is characterized in that, in the formation of a tubular article by injecting a thermoplastic resin into the mold having a tubular cavity formed therein, the resin is injected through a gate positioned at one end of the tubular cavity at an angle of not less than 5° relative to the direction of length of the tubular cavity.

The mechanism used for the injection molding is composed of a nozzle of the injection molding machine (the leading end part of an extruding machine), the sprue 7 (the part which contacts the nozzle of the injection molding machine), the runner 8 (a main path for leading the molding material from the sprue to the cavity), the gate 2 (an inlet for the flow of the molten resin into the cavity) and the cavity 1. The injected resin advances sequentially through these components in the order mentioned. Similar mechanisms lacking the sprue or the runner and called as a sprueless or a runnerless mechanism are also embraced by this invention.

The gate is generally known in several types, e.g. a sprue gate, a pinpoint gate, an edge gate, a disc gate, a ring gate, a tunnel gate, a submarine gate, a film gate, a rectangular gate, and a cylindrical gate. It has been heretofore held that such gates as the disc gate and the ring gate which are so adapted as to induce the inflow of the resin through the entire periphery of the cavity prove to be particularly desirable for producing such tubular articles as pipes by injection molding.

In this invention, however, any of the gates which enable the molten resin to flow with fixed directionality inside the cavity can be used. Specifically, a gate to be selected from among a sprue gate, a pinpoint gate, an edge gate, a tunnel gate (such as, for example, submarine gate), a film gate, a rectangular gate, and a cylindrical gate is used. Particularly, such gates as the tunnel gate (a submarine gate, for instance), the rectangular gate, and the cylindrical gate which have a relatively small cross-sectional area and enable the molten resin to flow easily with fixed directionality inside the cavity prove to be desirable. These desirable gates are illustrated in FIGS. 12 to 14. In FIGS. 12 to 14, the reference numeral 1 stands for a cavity. In each of the figures, FIG. (b) represents a cross section of the part shown in the FIG. (a). As respects the size of such a gate, the minimum cross-sectional surface area of the gate in the direction perpendicular to the direction of the flow of the resin passing through the gate is in the range of from 0.01 to 100 $mm^2$, preferably from 0.02 to 50 $mm^2$. The length of the gate in the direction of the flow of the molten resin is in the range of from 0.5 to 30 mm, preferably from 1 to 20 mm.

The gate is provided, for example, at one end in the longitudinal direction of the cavity 1 adapted to form the tubular article as illustrated in FIGS. 12 to 15. It does not matter whether the end may lie on the upper side or the down side. In any event, it is only important that the gate be capable of causing the molten resin to flow in obliquely from one to the other end. When the gate is provided midway along the length of the cavity, for example, the molten resin flowing through this gate is parted in the gate part, advanced around the interior of the cavity, and rejoined on the opposite side of the cavity and consequently likely to give rise to a weld line there. The occurrence of this weld line is at a disadvantage in degrading the mechanical strength of the produced tubular article.

Within the scope of this invention, it is essential that owing to the disposition of the gate, the direction of the flow of the molten resin flowing through the gate be inclined by an angle of not less than 5° relative to the longitudinal direction of the cavity shaping the tubular article (the central axis of the tubular article as a product aimed at). By the use of this construction, the molten resin which has obliquely flowed into the cavity through the end thereof is spirally advanced as swirled round the core inside the cavity serving to shape the tubular article and made to fill the cavity gradually from one end thereof on the gate side. The tubular article which is obtained in consequence of the spiral advance of the molten resin inside the cavity only rarely sustains a longitudinal crack, for example, because the molecules of the resin are not uniformly oriented in one direction. It cannot form a weld line on the outer surface thereof.

Further, the adoption of this method of molding allows production of tubular articles which enjoy enhanced dimensional stability. If the molten resin is simply made to flow into the mold from one end thereof in a direction parallel to the longitudinal direction of the mold, for example, the produced tubular article suffers from poor dimensional stability because it acquires a larger linear expansion coefficient in the circumferential direction than in the longitudinal direction. The tubular article of this invention, however, acquires improved dimensional stability (dimensional accuracy) because the difference of linear expansion coefficient in the longitudinal direction and the circumferential direction is small.

If the direction of the flow of the molten resin is indeed oblique and nevertheless substantially parallel (0°) to the longitudinal direction of the mold, the revolving force exerted on the molten resin will be so weak that the molten resin may not be revolved sufficiently to generate a spiral motion. Thus, the angle of inclination of the flow of the molten resin is required to be not less than 5°, preferably not less than 10° C.

The "oblique direction" under consideration embraces substantial perpendicularity (90°) to the longitudinal direction of the tubular article. The term "angle of 90°" implies the fact that the molten resin is made to flow into the cavity in a substantially tangential direction relative to the cavity having an annular cross section. Even when the molten resin is made to flow in the tangential direction as described above (so that the flow of the incoming molten resin has substantially no component of longitudinal direction as the component of velocity), the effect of this invention is manifested because the molten resin entering the cavity through the end thereof is advanced from this end to the other end as spirally revolved and enabled to fill the interior of the cavity gradually. When the direction of such substantial perpendicularity is adopted, the position assigned to the gate actually falls rather on the lateral part in the immediate vicinity of the end part of the tubular article than on the end part of the tubular article. It is desired that the tubular article have a smooth surface on the lateral side thereof, though depending on the intended use thereof. The infliction of a mark of the gate on the lateral part of the tubular article, therefore, entails the disadvantage that the elimination of the mark will necessitate an extra work of polishing, for example. The upper limit of the angle of inclination, therefore, is less than 90°, preferably not more than 80°. In consideration of all the factors remarked above, it is concluded that the most desirable angle is in the range of from 10° to 80°.

Though the installation of one gate in the end part or in the immediate vicinity thereof generally suffices, it is desirable to have two or more gates installed as illustrated in FIG. 15. When a plurality of gates are installed, the flows of molten resin introduced through these gates are desired to advance in one same direction at one same angle. It is desired that they be disposed at mutually opposed positions on the perimeter of the tubular article. By the provision of a plurality of gates, the manifestation of the effect of this invention is facilitated because the flows of molten resin entering the cavity are spirally revolved with enhanced force and made to fill the cavity gradually.

The aforementioned resins are cited as concrete examples of the thermoplastic resin to be used here. Among other examples mentioned above, those thermoplastic resins which pass as engineering plastics prove to be particularly desirable. Thermotropic liquid crystal resins, especially thermotropic liquid crystal polyester resins, are used preferably.

The thermoplastic resin mentioned above may incorporate therein various additives, depending on the intended use of the product. As concrete examples of the additives, the inorganic and organic fillers, pigments, dyes, plasticizers, oils, slip additives, seed forming agents, antistatic agent and flame retardants which are mentioned above are cited.

The injection molding machine to be used in this invention is not particularly limited. It may be any of the injection molding machines of all the types including screw-in line type, preplasticating type, horizontal type, vertical type and the type furnished with a compression mechanism.

When a thermotropic liquid crystal resin, especially a thermotropic liquid crystal polyester resin, is used for the injection molding, the conditions for this injection molding may be suitably selected from the range of resin temperature from 200° C. to 420° C., the range of mold temperature from 60° C. to 170° C., preferably from 60° C. to 130° C., the range of injection pressure from 10 to 2000 kg/cm$^2$ and the range of injection speed from 5 to 500 mm/sec.

The specific dimensions, i.e. thickness, diameter and length, of the tubular article of this invention are dominated by the shape of the manufacturable mold and are not particularly limited so long as they belong to a tubular article. In the case of injection molding a thermotropic liquid crystal resin, especially a thermotropic liquid crystal polyester resin, the thickness is not less than 0.5 mm, preferably not less than 1 mm and not more than 10 cm, the equivalent diameter is not less than 5 mm, preferably not less than 8 mm and not more than 1000 mm, and the length is not less than 10 mm, preferably not less than 50 mm and not more than 10 m.

BEST MODE FOR CARRYING OUT THE INVENTION

Now, the present invention will be specifically described below with reference to working examples and the like.

EXAMPLE 1

Figure 7A:
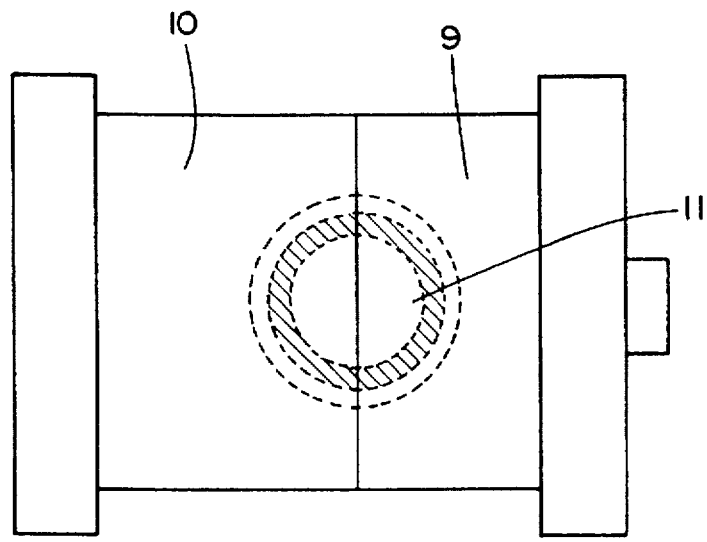
FIG. 7 is a top view and a cross section of a mold to be used for this invention.
Figure 7B:
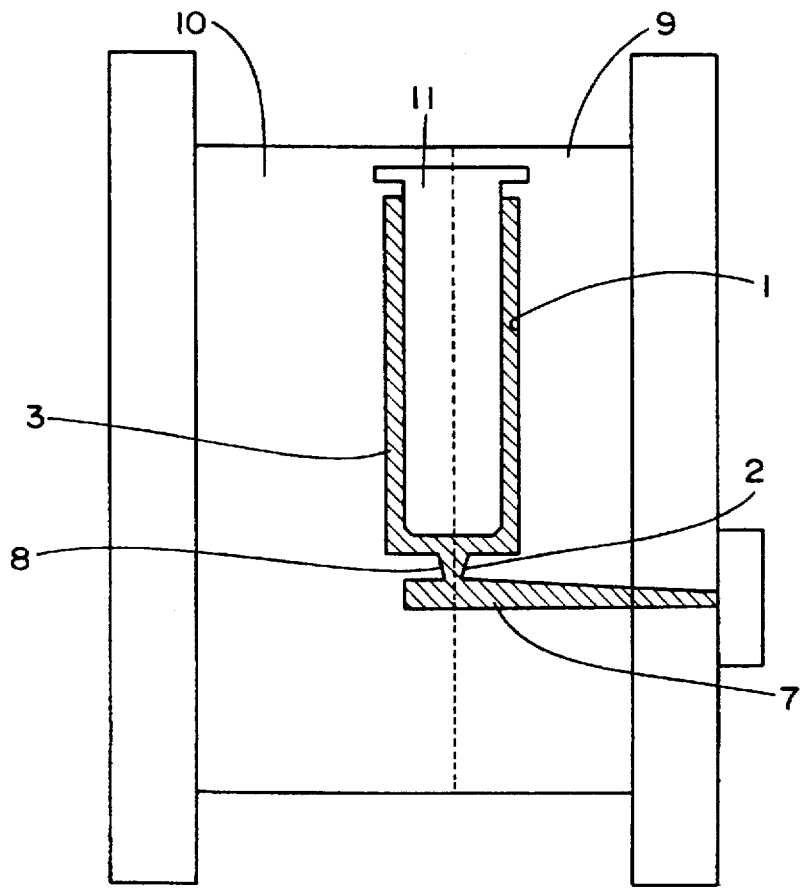
Figure 8:
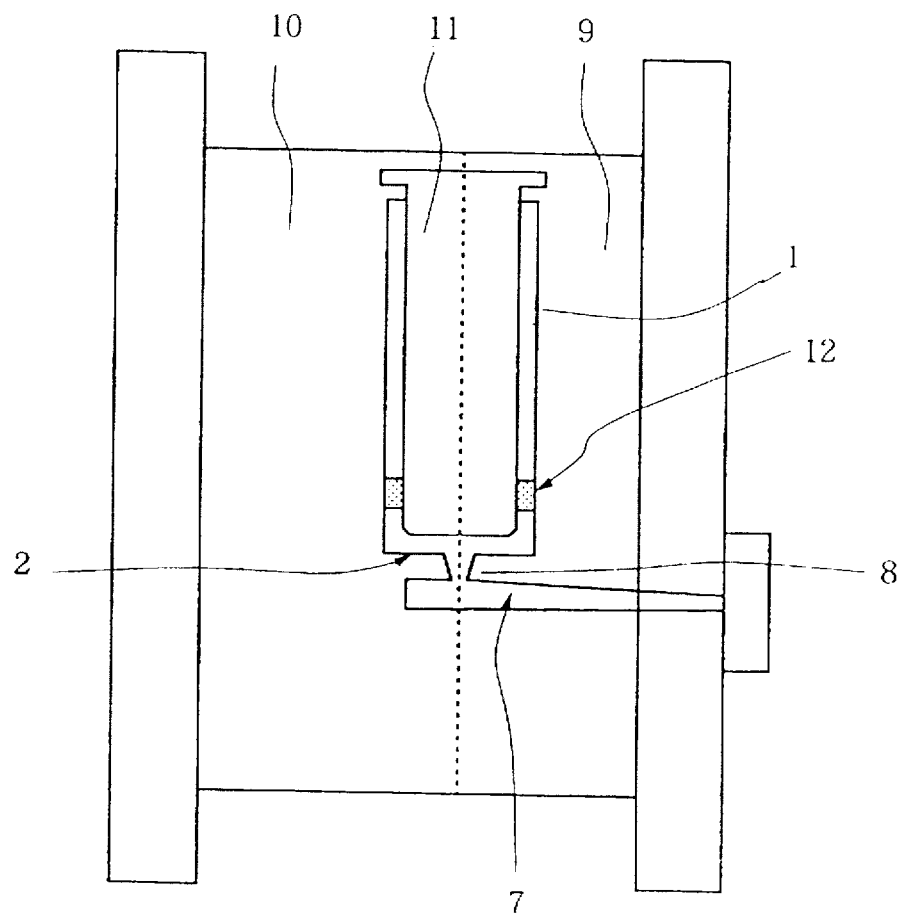
FIG. 8 is a schematic cross section illustrating one example of the method of injection molding according to this invention.
Figure 9A:
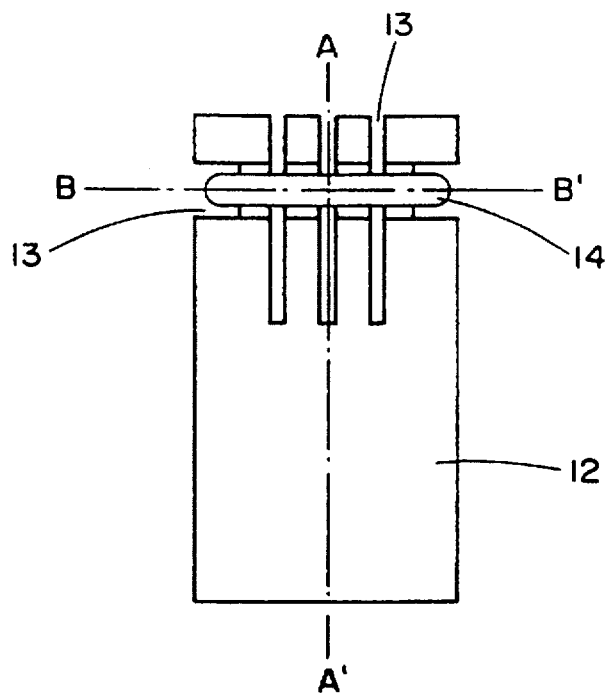
FIG. 9 is a side view and a cross section of a retainer member to be used for this invention.
Figures 9B, 9C:
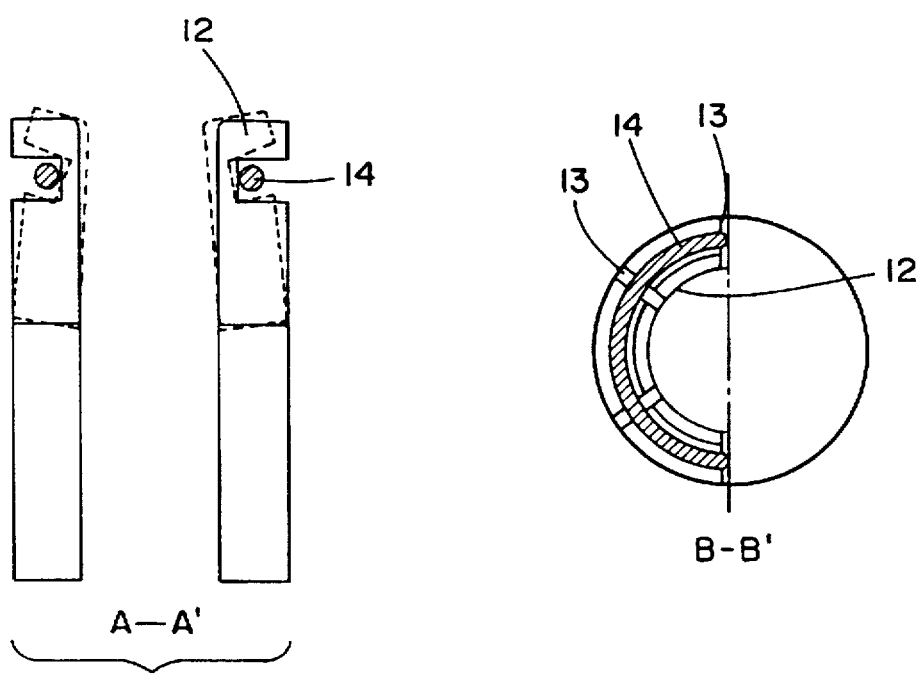

By the use of a mold of a thickness of 350 mm constructed as shown in FIG. 7 and incorporating a metallic retainer member 12 therein, polybutylene terephthalate (a synthetic resin produced by Kuraray Co., Ltd. and marketed under trademark designation of "Hauser R1300") was injection molded. After the injection molding, the mold was moved and released together with a columnar member 11 and a tubular article consequently produced was removed and the columnar 11 was extracted. Thus, the tubular article was obtained.

As a result, a cylindrical injection molded article 107 mm in length, 20 mm in outside diameter, and 2 mm in wall thickness was obtained. The maximum difference of wall thickness of this tubular article was 0.2 mm.

As a molding machine, an injection molding machine (mold opening stroke 460 mm) produced by Toshiba Machine Co., Ltd. and marketed under product code of "IS-80" was adopted and operated under the conditions of 250° C. of molding temperature, 100 mm/sec of injecting speed and 60° C. of mold temperature. The retainer member measured 20 mm in outside diameter, 16 mm in inside diameter and 10 mm in height. It was made of gunmetal (an alloy of 90% by weight of copper and 10% by weight of tin).

The columnar member 11 and the mold had their surfaces finished without using a plating treatment and had a surface roughness, Rmax, of 0.8 μmm. The columnar members and the molds used in the examples and the comparative examples to be cited hereinbelow had the same surface roughness as those of the present example. These components of the injection molding machine and the formed articles as well were invariably tested for surface roughness, Rmax, by the method which is described hereinbefore.

The tubular article obtained as described above had the outer surface thereof tested for surface roughness, Rmax, in the longitudinal direction. This surface roughness was found to be in the range of from 1.5 to 2.0 μm.

EXAMPLE 2

By the use of a mold of a thickness of 350 mm constructed as shown in FIG. 7 and incorporating a metallic retainer member therein, a thermotropic liquid crystal polyester resin (a synthetic resin having a repeating unit derived by combining phthalic acid/isophthalic acid/4-hydroxybenzoic acid/4,4-dihydroxydiphenyl at a molar ratio of 0.75/0.25/3/1, found by observation under a polarizing microscope fitted with a hot stage to exhibit optical anisotropy in a molten state at a temperature of not less than 340° C., and made to incorporate therein 30% by weight of glass fibers in the process of injection molding) was injection molded. After the injection molding, the mold was moved and released together with a columnar member 11 and a tubular article consequently produced was removed and the columnar 11 was extracted. Thus, the tubular article was obtained.

As a result, a cylindrical injection molded article 300 mm in length, 16 mm in outside diameter, and 2 mm in wall thickness was obtained. The maximum difference of wall thickness of this tubular article was 0.1 mm.

As a molding machine, an injection molding machine (die squeezing stroke 460 mm) produced by Toshiba Machine Co., Ltd. and marketed under product code of "IS-80" was adopted and operated under the conditions of 350° C. of molding temperature, 50 mm/sec of injecting speed and 80° C. of mold temperature. The retainer member measured 16 mm in outside diameter, 12 mm in inside diameter and 20 mm in height. It was made of gunmetal (an alloy of 90% by weight of copper and 10% by weight of tin).

The tubular article obtained as described above had the outer surface thereof tested for surface roughness, Rmax, in the longitudinal direction. This surface roughness was found to be in the range of from 0.8 to 1.0 μm.

COMPARATIVE EXAMPLE 1

By the use of a mold 350 mm in thickness constructed as shown in FIG. 7 and incorporating no metallic retainer member, the same thermotropic liquid crystal polyester resin as used in Example 2 was injection molded. After the injection molding, the mold was moved and released together with a columnar member 11 and a tubular article consequently produced was removed and the columnar member 11 was extracted. Thus, the tubular article was obtained.

According to the design, the injection molding was expected to produce a cylindrical article measuring 300 mm in length, 16 mm in outside diameter and 2 mm in wall thickness. The tubular article consequently obtained had a maximum difference of wall thickness of 0.5 mm.

The molding machine used herein was the same as used in Example 2 and the molding temperature, the injection speed, and the mold temperature were the same as used in Example 2.

The tubular article had the outer surface thereof tested for surface roughness, Rmax, in the longitudinal direction. This surface roughness was found to be in the range of from 5 to 10 μm.

EXAMPLE 3

Figure 10:
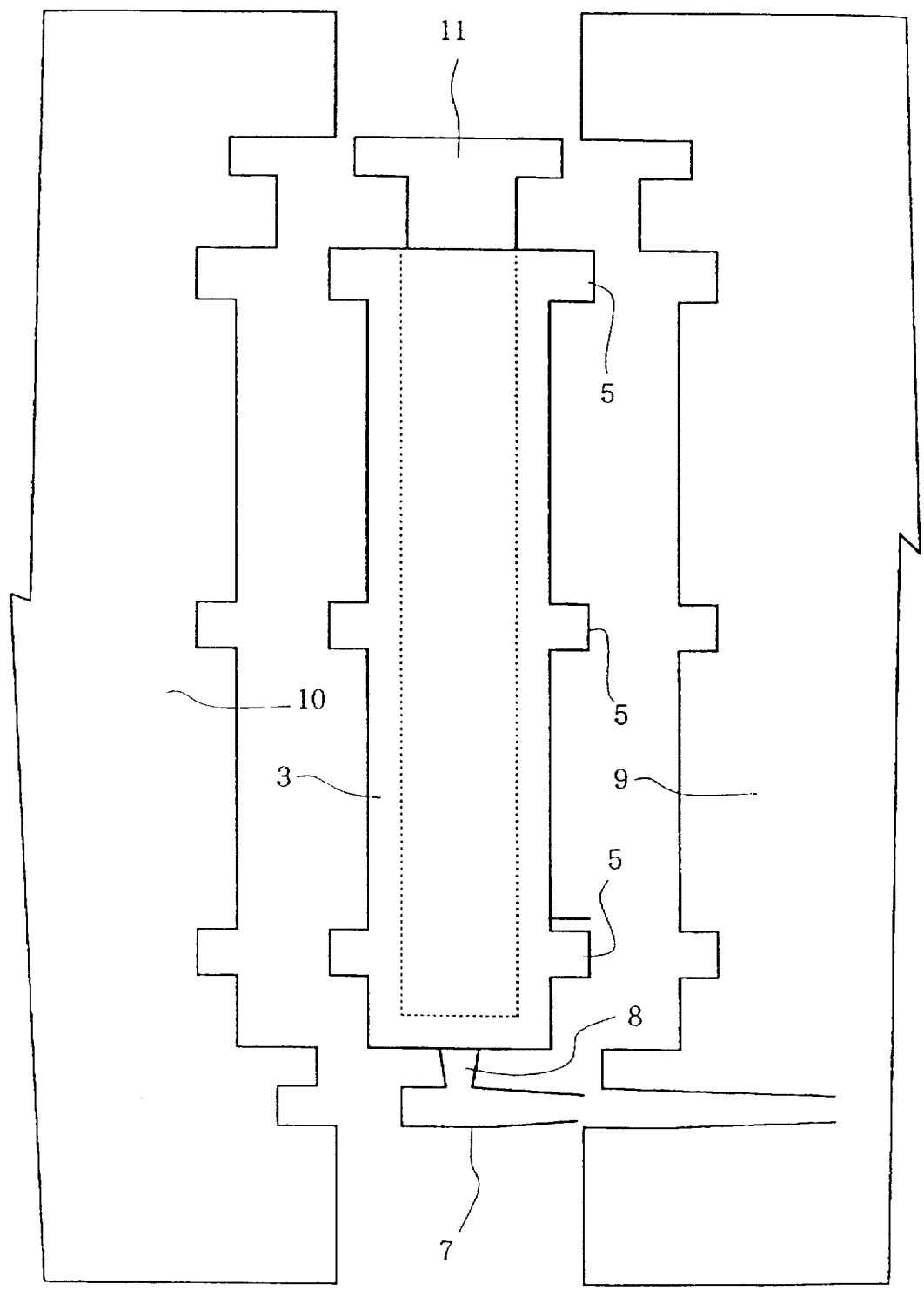
FIG. 10 is a schematic cross section illustrating another example of the method of injection molding according to this invention.
Figure 11:
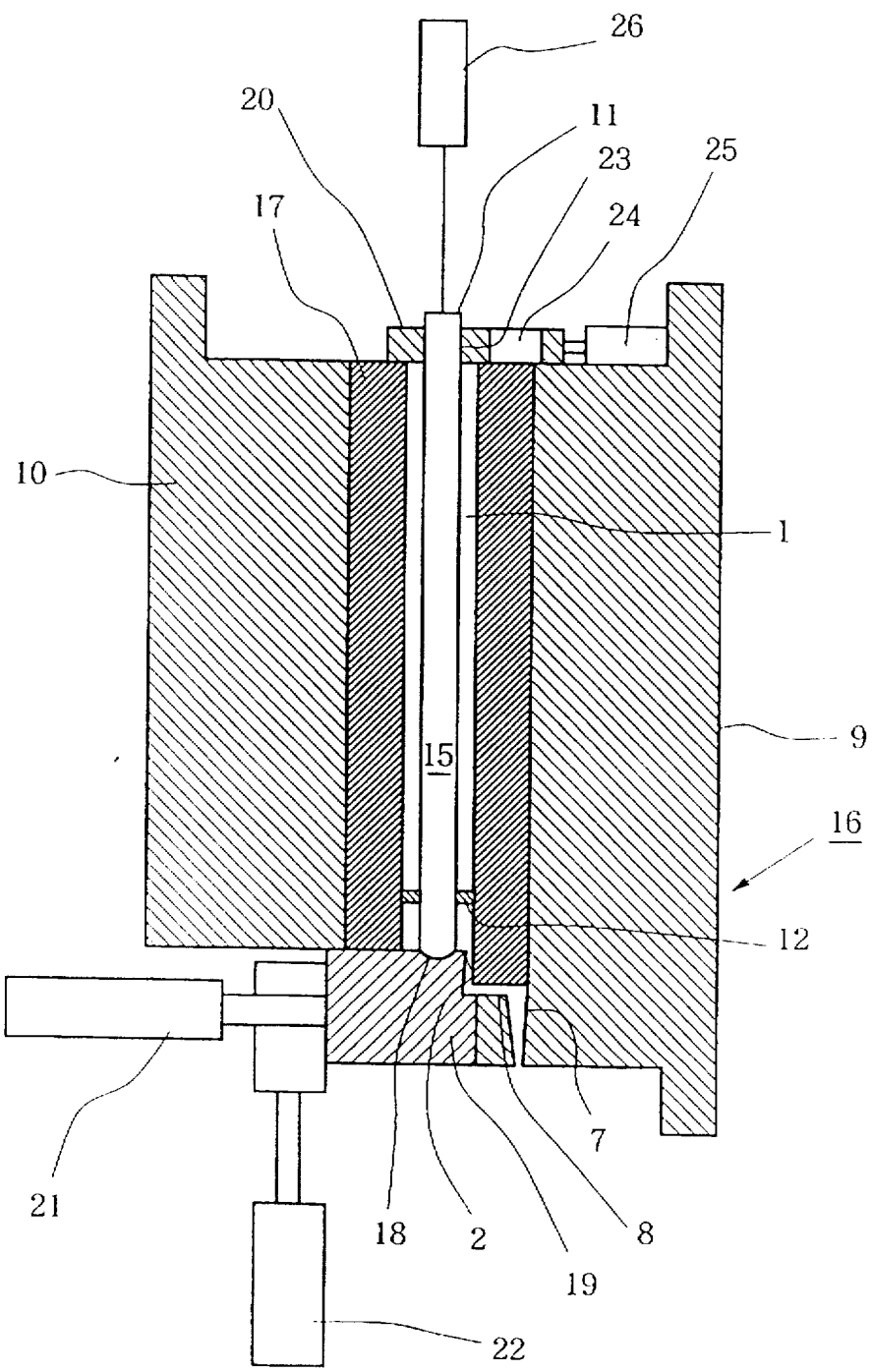
FIG. 11 is a detailed drawing of a mold to be used for this invention.
Figure 12A:
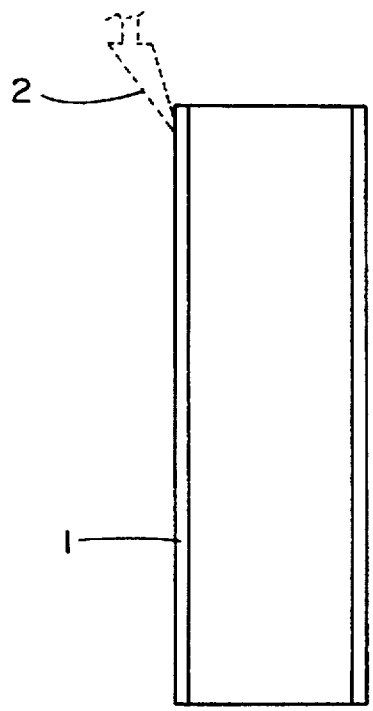
FIG. 12 is a longitudinal cross section and a top view illustrating a tunnel gate (submarine gate) of a tubular cavity.
Figure 12B:
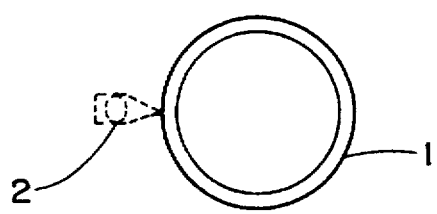
Figure 13A:
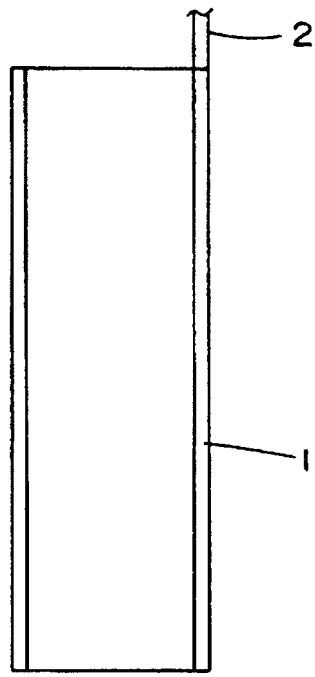
FIG. 13 is a longitudinal cross section and a top view illustrating a rectangular gate of a tubular cavity.
Figure 13B:
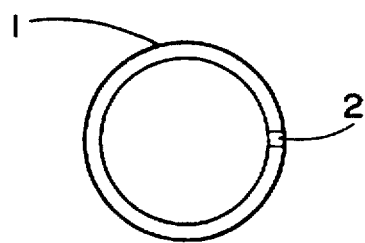
Figure 14A:
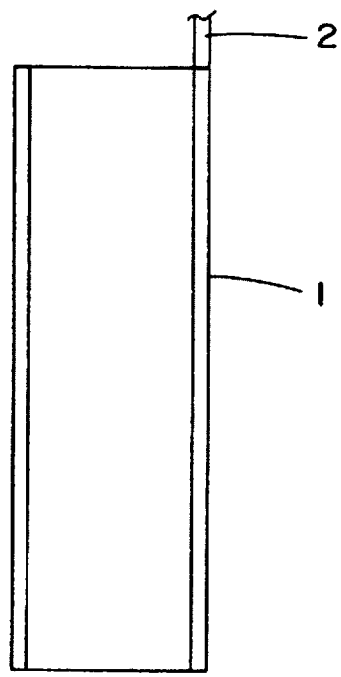
FIG. 14 is a longitudinal cross section and a top view illustrating a cylindrical gate of a tubular cavity.
Figure 14B:
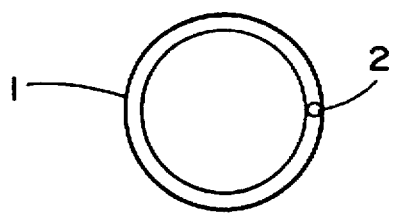
Figure 15A:
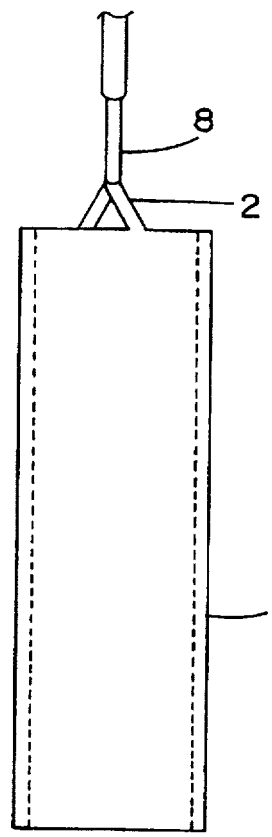
FIG. 15 is a longitudinal cross section, a top view, and a perspective view illustrating a two-point gate of a tubular cavity.
Figure 15B:
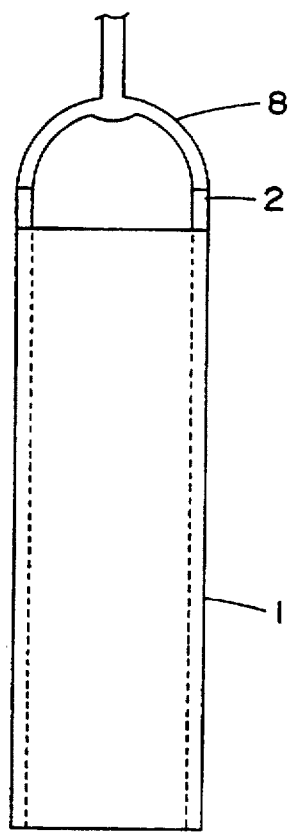
Figure 15D:
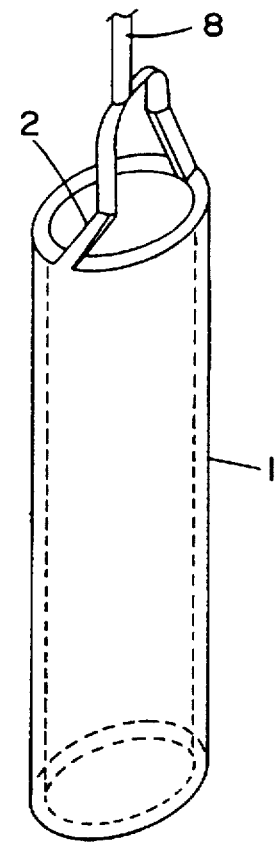
Figure 15C:
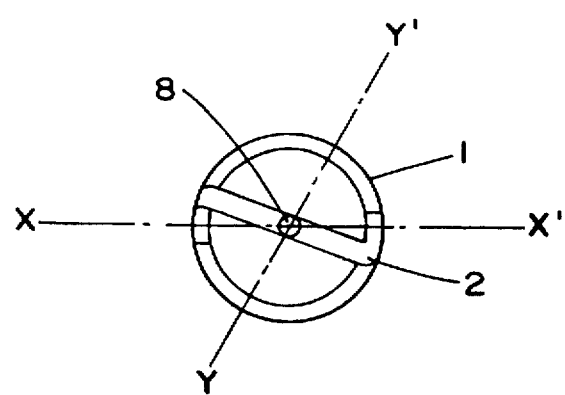

By the use of a mold 350 mm in thickness constructed as shown in FIG. 10 and incorporating a metallic retainer member therein, a mixture of 70 parts by weight of the same polybutylene terephthalate as used in Example 1 with 30 parts by weight of glass fibers was injection molded. After the injection molding, the mold was moved and released together with a columnar member 11 and a tubular article consequently produced was removed and the columnar member 11 was extracted. Thus, the tubular article was obtained.

As a result, a tubular article of synthetic resin measuring 107 mm in length, 20 mm in outside diameter, 2 mm in wall thickness and 2 mm in flange thickness and provided with three flanges was obtained. The maximum difference of wall thickness of this tubular article was 0.2 mm.

As a molding machine, an injection molding machine (die squeezing stroke 460 mm) produced by Toshiba Machine Co., Ltd. and marketed under product code of "IS-80" was adopted and operated under the conditions of 250° C. of molding temperature, 100 mm/sec of injecting speed and 60° C. of mold temperature. The retainer member measured 20 mm in outside diameter, 16 mm in inside diameter and 10 mm in height. A ring was made of gunmetal (an alloy of 90%by weight of copper and 10% by weight of tin).

The tubular article obtained as described above had the outer surface thereof tested for surface roughness, Rmax, in the longitudinal direction. This surface roughness was found to be in the range of from 1.6 to 2.3 μm.

EXAMPLE 4

By the use of a mold 350 mm in thickness constructed as shown in FIG. 10 and incorporating a metallic retainer member therein, the same thermotropic liquid crystal polyester liquid crystal as used in Example 2 was injection molded. After the injection molding, the mold was moved and released together with a columnar member 11 and a tubular article consequently produced was removed and the columnar member 11 was extracted. Thus, the tubular article was obtained.

As a result, a tubular article of synthetic resin measuring 300 mm in length, 16 mm in outside diameter, 2 mm in wall thickness and 2 mm in flange thickness and provided with three flanges was obtained. The maximum difference of wall thickness of this tubular article was 0.1 mm.

As a molding machine, an injection molding machine (die squeezing stroke 460 mm) produced by Toshiba Machine Co., Ltd. and marketed under product code of "IS-80" was adopted and operated under the conditions of 350° C. of molding temperature, 50 mm/sec of injecting speed and 80° C. of mold temperature. The retainer member measured 16 mm in outside diameter, 12 mm in inside diameter and 20 mm in height. A ring was made of gunmetal (an alloy of 90% by weight of copper and 10% by weight of tin).

The tubular article obtained as described above had the outer surface thereof tested for surface roughness, Rmax, in the longitudinal direction. This surface roughness was found to be in the range of from 0.7 to 0.8 μm.

EXAMPLE 5

By the use of a mold 350 mm in thickness constructed as shown in FIG. 7 and incorporating a metallic ring therein, the same thermotropic liquid crystal polyester liquid crystal as used in Example 2 was injection molded. After the injection molding, the mold was moved and released together with a columnar member 11 and a tubular article consequently produced was removed and the columnar member 11 was extracted. Thus, the tubular article was obtained.

As a result, a tubular article of synthetic resin measuring 300 mm in length, 16 mm in outside diameter and 2 mm in wall thickness and provided with a shaft (10 mm in diameter) was obtained. The maximum difference of wall thickness of this tubular article was 0.1 mm.

As a molding machine, an injection molding machine (die squeezing stroke 460 mm) produced by Toshiba Machine Co., Ltd. and marketed under product code of "IS-80" was adopted and operated under the conditions of 350° C. of molding temperature, 50 mm/sec of injecting speed and 80° C. of mold temperature. The retainer member measured 16 mm in outside diameter, 12 mm in inside diameter and 20 mm in height. A ring was made of gunmetal (an alloy of 90% by weight of copper and 10% by weight of tin).

The tubular article obtained as described above had the outer surface thereof tested for surface roughness, Rmax, in the longitudinal direction. This surface roughness was found to be in the range of from 0.7 to 0.8 μm.

EXAMPLE 6

A thermoplastic resin composition was prepared by mixing 70 parts by weight of the same thermotropic liquid crystal polyester resin as used in Example 2 with 30 parts by weight of electroconductive carbon black. This thermoplastic resin composition was found to have volume resistivity of 0.7 Ω.cm and a deflection temperature of 246° C. under a load of 18.6 kg/cm$^2$ as measured in accordance with ASTM D 648 with necessary modifications.

By the use of a mold 350 mm in thickness constructed as shown in FIG. 7 and incorporating a metallic ring therein, this thermoplastic resin composition was injection molded. After the injection molding, the mold was moved and released together with a columnar member 11 and a tubular article consequently produced was removed and the columnar member 11 was extracted. Thus, a heating tubular article was obtained.

As a result, a heating tubular article measuring 300 mm in length, 16 mm in outside diameter and 2 mm in wall thickness. The maximum difference of wall thickness of this tubular article was 0.1 mm.

As a molding machine, an injection molding machine (die squeezing stroke 460 mm) produced by Toshiba Machine Co., Ltd. and marketed under product code of "IS-80" was adopted and operated under the conditions of 350° C. of molding temperature, 50 mm/sec of injecting speed and 80° C. of mold temperature. The ring measured 16 mm in outside diameter, 12 mm in inside diameter and 20 mm in height. The ring was made of gunmetal (an alloy of 90% by weight of copper and 10% by weight of tin).

When this heating tubular article was electrified with a potential of 100 V, generation of uniform heat of 190° C. was recognized throughout the entire volume of the tubular article.

The tubular article obtained as described above had the outer surface thereof tested for surface roughness, Rmax, in the longitudinal direction. This surface roughness was found to be in the range of from 0.8 to 1.0 μm.

EXAMPLE 7

A tubular article 200 mm in length, 20 mm in outside diameter, and 2 mm in wall thickness was produced by injection molding the same thermotropic liquid crystal polyester resin as used in Example 2 in entirely the same manner as in Example 2.

This tubular article was spray coated with a silicone resin type coating material (produced by Rock Paint Co., Ltd. and marketed under trademark designation of "Emyluck 055-0630") which has 20 μm in thickness and left standing at normal room temperature for 20 hours to dry the applied coating. The coated tubular article was placed in a heating furnace at 250° C. and heated therein for one hour. At the end of the heating, it showed no sign of change of appearance due to swelling, peeling or discoloration.

When this coated article was given 100 repeated frictions under a load of 500 g by the use of a Nema type abrasion tester (produced by Toyo Seiki Seisakusho), it sustained no damage due to excoriation on the surface thereof.

When the tubular article thus obtained had the outer surface thereof tested for surface roughness, Rmax, the surface roughness was found to be in the range of from 0.8 to 1.0 μm.

EXAMPLE 8

By the use of a biaxial extruding machine, 100 parts by weight of the same thermotropic liquid crystal resin as used in Example 2 and 45 parts by weight of glass fibers measuring 200 μm in length and 10 μm in diameter and having an aspect ratio of 20 (produced by Asahi Fiber Glass K. K. and marketed under trademark designation of "Mild GF MF20JHI-20") were kneaded and pelletized to produce a composition.

Figure 1A:
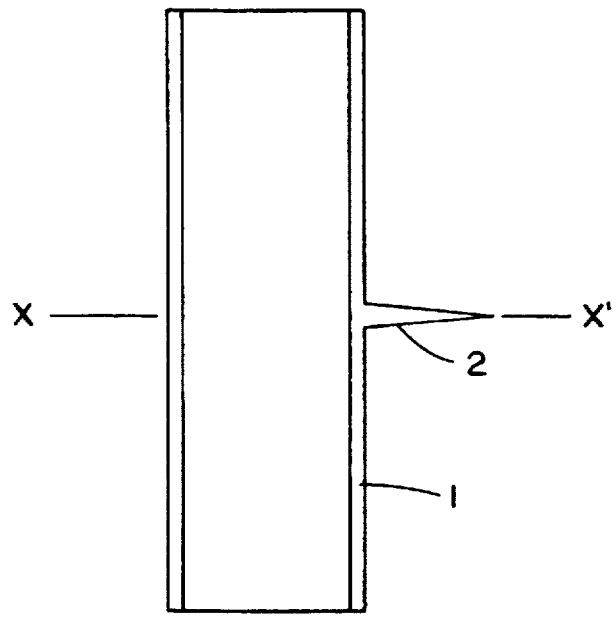
FIG. 1 is a longitudinal cross section and a lateral cross section illustrating a middle point gate of a tubular cavity.
Figure 1B:
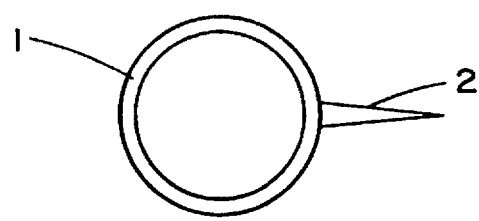
Figure 2A:
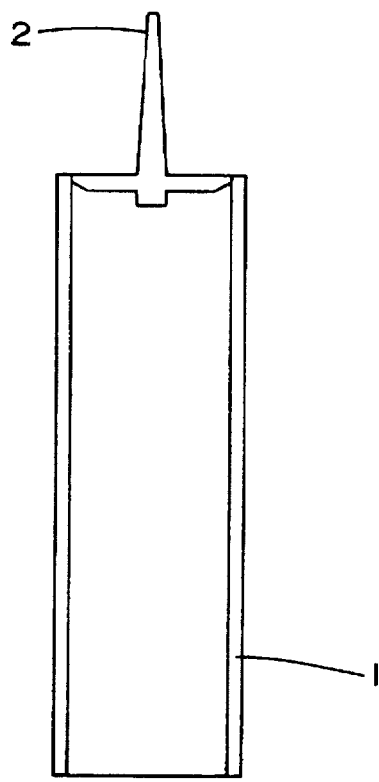
FIG. 2 is a longitudinal cross section and a top view illustrating a disc gate of a tubular cavity.
Figure 2B:
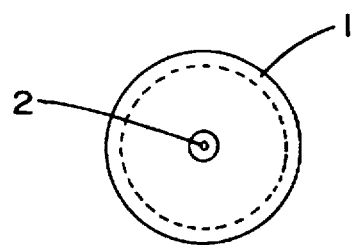
Figure 3:
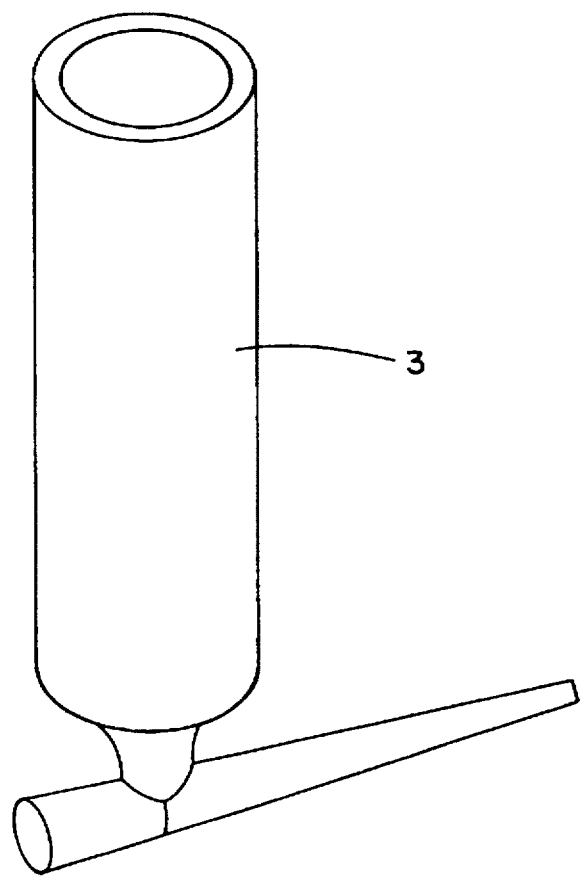
FIG. 3 is a perspective view illustrating one example of the tubular article of this invention.
Figure 4:
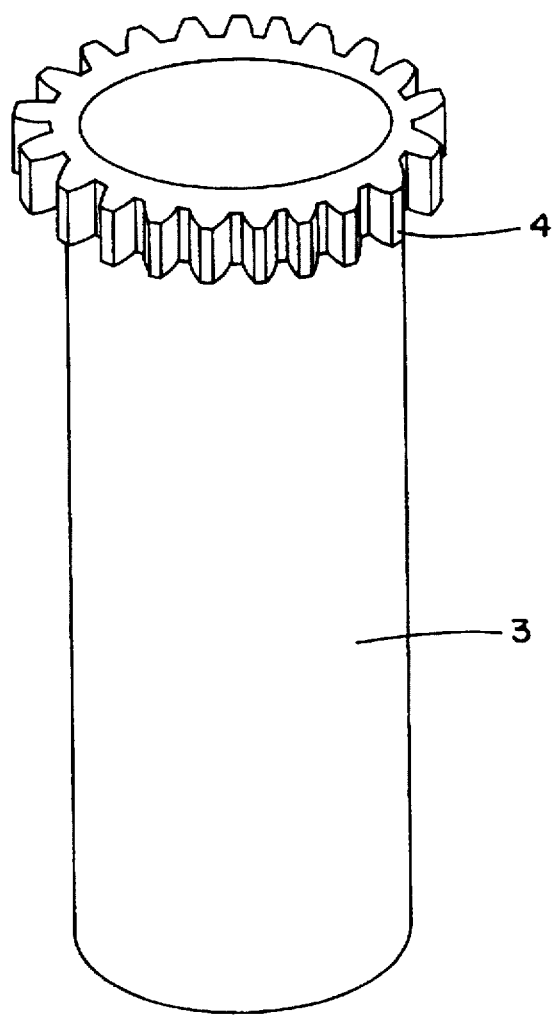
FIG. 4 is a perspective view of the tubular article of this invention provided with a toothed member.
Figure 5:
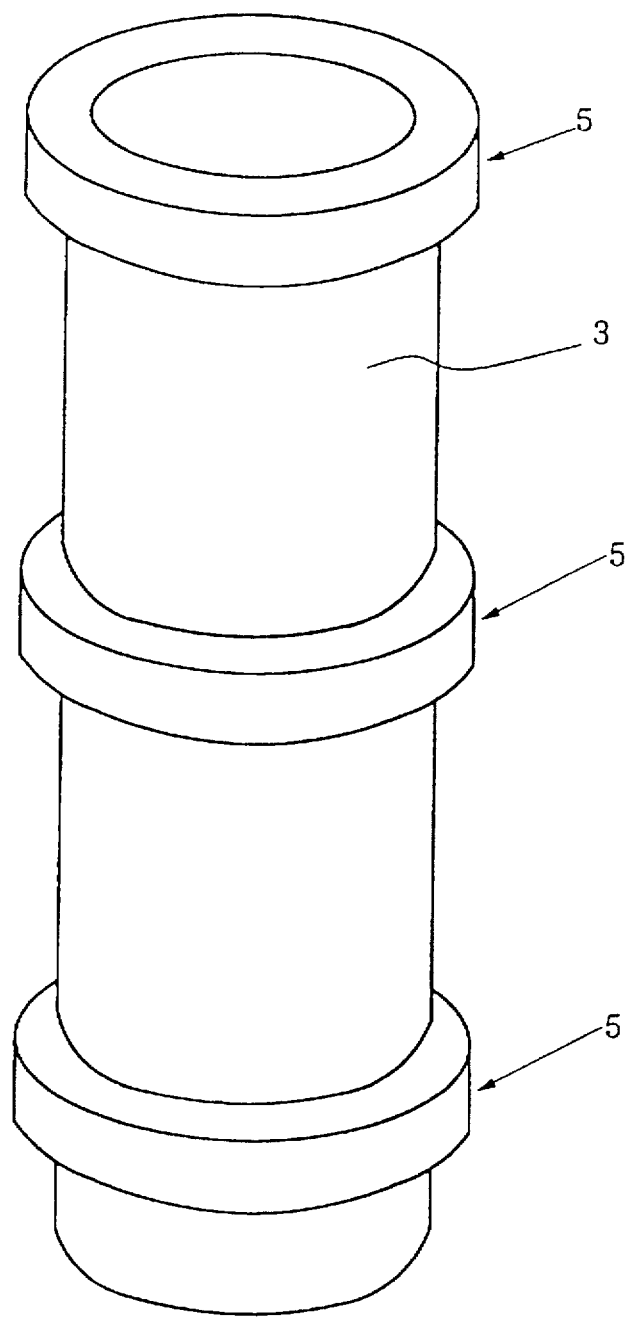
FIG. 5 is a perspective view of the tubular article of this invention provided with a flange.
Figure 6:
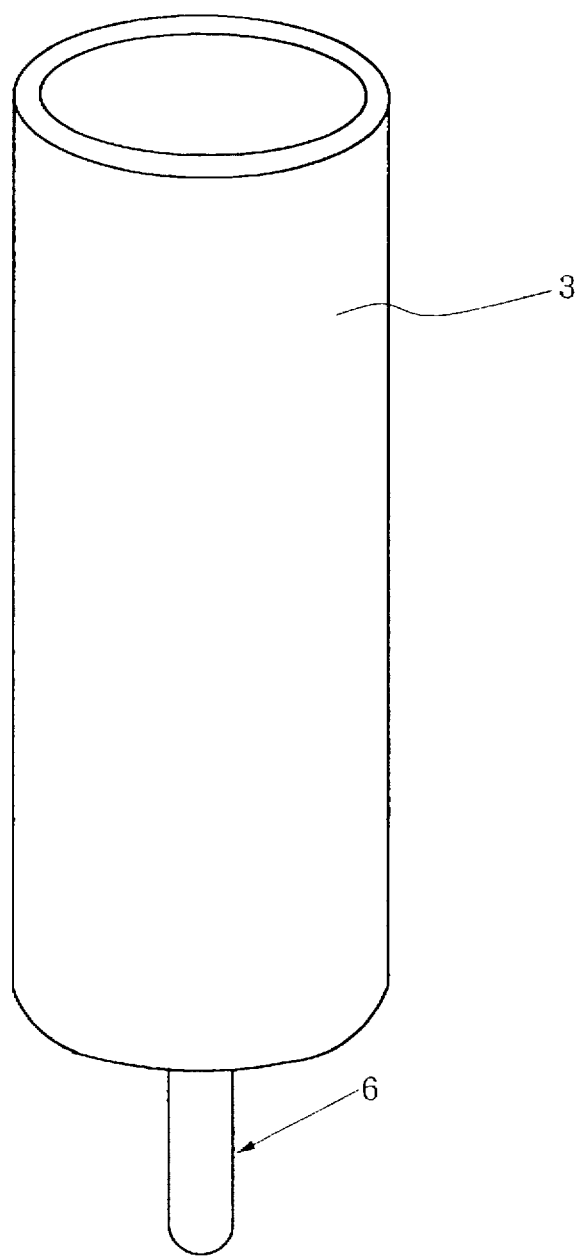
FIG. 6 is a perspective view of the tubular article of this invention provided with a shaft.

By the use of a mold constructed as shown in FIG. 7, this composition was injection molded to produce a tubular article (measuring 30 cm in length, 2 cm in outside diameter and 2 mm in thickness) as shown in FIG. 3. The molding machine used for the injection molding was a product of Toshiba Machine Co., Ltd. marketed under product code of "IS-80".

In an aqueous solution containing 800 g of KOH per liter, this tubular article was given an etching treatment at 70° C. for 40 minutes. The etched tubular article was rinsed with water and then subjected to electroless copper plating with the following chemicals (invariably produced by Okuno Seiyakukogyo K. K. and marketed under trademarks indicated hereinbelow) under the conditions correspondingly remarked.

(1) Conditioning: Condilyzer SP (150 ml/liter, 40° C., 40 minutes)

(2) Addition of catalyst: Catalyst C (100 ml/liter, 23° C., 4 minutes)

(3) Activation: Sulfuric acid (100 ml/liter, 40° C., 4 minutes)

(4) Electroless copper plating: OPC-Copper-H (23° C., 10 minutes)

The resultant copper plated tubular article was immersed in a plating bath formed mainly of nickel sulfate and nickel chloride and subjected to electrolytic plating by the standard method to form a nickel layer 60 μm in thickness thereon.

The tubular article consequently produced had the outer surface thereof tested for surface roughness, Rmax, in the longitudinal direction. The surface roughness was found to be in the range of from 0.9 to 1.2 μm.

EXAMPLE 9

A tubular article having the same shape as the tubular article of Example 8 was produced by injection molding a composition prepared by combining 100 parts by weight of the same thermotropic liquid crystal polyester resin as used in Example 2 with 50 parts by weight of calcium carbonate (having an average particle diameter of 5 μm). In an aqueous solution containing 300 g of KOH per liter and kept at 50° C., this tubular article was subjected to an etching treatment under application of ultrasonic wave for 10 minutes. The etched tubular article was rinsed with water and then subjected to the same electroless copper plating treatment and electrolytic nickel plating treatment in the same manner as in Example 8.

The tubular article consequently produced had the outer surface thereof tested for surface roughness, Rmax, in the longitudinal direction. The surface roughness was found to be in the range of from 0.9 to 1.2 μm.

EXAMPLE 10

A mold containing a tubular cavity 1 measuring 20 mm in outside diameter, 16 mm in inside diameter and 300 mm in length and constructed as shown in FIG. 15 (a) to (d) (the outer block of the mold having a columnar hole dug therein and a solid bar inserted as a core in the hole thereby giving rise to the tubular cavity) was manufactured. FIG. 15 (a) represents a lateral cross section taken through FIG. 15 (c) along the line X-X' and FIG. 15 (b) a lateral cross section taken through FIG. 15 (c) along the line Y-Y'. FIG. 15 (d) represents a perspective view of the mold.

This mold was provided in the lower end of the cavity with two gates 2 disposed as opposed to each other (which were each a cylindrical gate whose minimum cross-sectional area in a direction perpendicular to the direction of flow of the molten resin was 10 mm$^2$ and whose length in the direction of flow was 5 mm). The directions of flow of the molten resin being introduced through the gates were both 45° relative to the longitudinal direction of the tubular cavity. A runner 8 which was laid to communicate with the gates 2 was connected to a sprue and a nozzle of an injection molding machine.

By the use of the mold mentioned above, a composition prepared by combining 100 parts by weight of the same thermotropic liquid crystal polyester resin as used in Example 2 with 30 parts by weight of glass fibers was injection molded by the standard method. After the injection molding, a tubular product consequently obtained was ejected. The tubular article thus produced had high dimensional accuracy.

The tubular article was subjected to a falling dart impact test. Specifically, a dart weighing 1 kg was dropped from prescribed heights onto one end (the gate side) of the tubular article to find the height of this drop of the dart which caused infliction of a crack to the tubular article. This height was found to be 56 cm. When the fracture face of this tubular article was visually examined, a spiral fracture line was found therein. This fact implies that the resin spirally filled the interior of the cavity.

COMPARATIVE EXPERIMENT 2

A mold identical with the mold of Example 10 excepting the two gates provided therefor were such that the directions of flow of molten resin being introduced were invariably 0° relative to the longitudinal direction of the tubular cavity (namely, parallel to the longitudinal direction and directly above the lower end of the cavity) was prepared. By the use of this mold, a tubular article was obtained by injection molding the same thermotropic liquid crystal polyester resin composition as used in Example 10.

When this tubular article was tested for dart impact strength in the same manner as in Example 10, the result was 28 cm. This magnitude indicates that the dart impact strength of this tubular article was lower than that of the tubular article of Example 10. When the fracture face of the tubular article was visually examined, a linear fracture line parallel to the longitudinal direction was found.

EXAMPLE 11

A mold containing a tubular cavity 1 measuring 20 mm in outside diameter, 16 mm in inside diameter and 300 mm in length and constructed as shown in FIG. 15 (a) to (d) (the outer block of the mold having a columnar hole dug therein and a solid bar inserted as a core in the hole thereby giving rise to the tubular cavity) was manufactured.

This mold was provided in the lower end of the cavity with two gates 2 disposed as opposed to each other (which were each a cylindrical gate whose minimum cross-sectional area in a direction perpendicular to the direction of flow of the molten resin was 10 mm$^2$ and whose length in the direction of flow was 5 mm). The directions of flow of the molten resin being introduced through the gates were both 45° relative to the longitudinal direction of the tubular cavity.

By the use of the mold mentioned above, a composition prepared by combining 70 parts by weight of polybutylene terephthalate with 30 parts by weight of glass fibers (produced by Kuraray Co., Ltd. and marketed under trademark designation of "Hauser R-1300") was injection molded by the standard method. After the inject ion molding, a tubular product consequently obtained was ejected. The tubular article thus produced had high dimensional accuracy.

The tubular article was subjected to a falling dart impact test. Specifically, a dart weighing 1 kg was dropped from prescribed heights onto one end (the gate side) of the tubular article to find the height of this drop of the dart which caused infliction of a crack to the tubular article. This height was found to be 59 cm. When the fracture face of this tubular article was visually examined, a spiral fracture line was found therein. This fact implies that the resin spirally filled the interior of the cavity.

COMPARATIVE EXAMPLE 3

A mold identical with the mold of Example 11 excepting the two gates provided therefor were such that the directions of flow of molten resin being introduced were invariably 0° relative to the longitudinal direction of the tubular cavity (namely, parallel to the longitudinal direction and directly above the lower end of the cavity) was prepared. By the use of this mold, a tubular article was obtained by injection molding the same polybutylene terephthalate composition as used in Example 11.

When this tubular article was tested for dart impact strength in the same manner as in Example 10, the result was 29 cm. This magnitude indicates that the dart impact strength of this tubular article was lower than that of the tubular article of Example 11. When the fracture face of the tubular article was visually examined, a linear fracture line parallel to the longitudinal direction was found.

Industrial Applicability

The tubular articles according to this invention are long products substantially uniform in wall thickness and, therefore, are used in numerous applications such as rollers in machines and electric appliances, as pipes for various purposes, and as containers like tea canisters.

Thermotropic liquid crystal resins, preferably thermotropic liquid crystal polyester resins, excel in mold flowability, manifest high dimensional accuracy and offer extremely high resistance to heat. The tubular articles made of these resins, therefore, are ideally used in machine parts which have the possibility of being normally exposed to elevated temperatures.

The heating tubular articles made of these resins can be used as heating rollers for various purposes. Further, these tubular articles, when provided with a protective film of a silicone resin type coating material, are capable of acquiring improved resistance to heat, abrasion, chemicals and weather conditions. The tubular articles, when furnished with a metallic coating, acquire surfaces excellent in slidability and durability. Particularly, when these tubular articles are electrolytically plated with nickel or chromium, they are improved in structural strength and rigidity.

The method of injection molding according to this invention produces relatively long tubular articles by injection molding synthetic resins and, therefore, permits efficient formation of products of outstanding dimensional accuracy. When a retainer member is utilized in the implementation of this method, the tubular articles to be consequently obtained excel particularly in accuracy of wall thickness.

Even when the method of injection molding according to this invention is employed for injection molding thermoplastic resins which are highly susceptible of orientation, the produced tubular articles acquire uniform mechanical strength and only rarely sustain longitudinal cracks due to high weld line strength.

This invention prominently manifests its effect particularly in thermoplastic resin compositions which, in spite of the use of a resin inherently difficult of orientation, are rendered by the incorporation therein of a fibrous or an acicular filler susceptible of the influence of the orientation of the filler, easy of orientation in the direction of flow while in a molten state as the so-called thermotropic liquid crystal resin which is easily oriented while in a molten state, or in the compositions of the resins mentioned above.

We claim:

1. A tubular article which is spirally oriented and exhibits a smooth surface and a substantially uniform wall thickness both in the circumferential direction and in the longitudinal direction, produced by injection molding a thermotropic liquid crystal resin, said tubular article exhibiting a spiral fracture face when fracturing at least a portion of said tubular article.

2. The article according to claim 1, wherein the ratio of the length (L) to the diameter (D) is not less than 2, the cross section is circular, triangular, tetragonal or other angular cross section, the surface roughness Rmax is 0.7–2.3 µm and the maximum difference of wall thickness is 0.2 mm.

3. The tubular article according to claim 1, wherein the thermotropic liquid crystal resin is a wholly aromatic polyester resin.

4. The article according to claim 1, wherein the thermotropic liquid crystal resin has an inorganic filler incorporated therein.

5. The tubular article according to claim 1, which has an accessory which is a flange, a gear or axle integrally injection molded.

6. The article according to claim 4, wherein the amount of said filler is 5–80 parts by weight based on 100 parts by weight of said resin.

7. The tubular article according to claim 4, wherein said filler is an electroconductive filler and the volume resistivity of said article is in the range of from $10^{-3}$ to $10^{-7}$ $\Omega$cm.

8. The tubular article according to claim 1, wherein said article has an outer surface and said article has on said outer surface a layer comprising a film layer capable of generating heat by electrifying said layer, and said layer is a metallic layer.

9. The tubular article according to claim 1, wherein said article is an electrical heating cylinder.

10. The tubular article according to claim 9, wherein said cylinder is provided on the outer surface thereof with a protective film.

11. The tubular article according to claim 10, wherein said protective film is made of a silicone resin coating material.

12. A method of producing a tubular article having a spiral fracture face and substantially uniform in wall thickness which consists of introducing a molten thermoplastic resin into an injection molding machine, said machine having a sprue (7) and at least one gate (2) at the bottom thereof, a cavity (1), a mold, a columnar member (11), said columnar member (11) being located within said mold, said mold comprising a stationary die (9) and a movable die (10), said machine comprising a retainer member (12) fitted to said columnar member and first located close to said gate, said retainer member being slidable in said cavity, injecting said resin through at least one gate positioned at one end of said tubular cavity at an angle not less than 5° relative to the longitudinal direction of said tubular cavity so as to form spiral orientation, allowing said resin to solidify in said cavity, to form a molded tubular article, extracting said columnar member and said molded tubular article from the mold.

13. The method according to claim 12, wherein said resin is injected at an angle up to 80°.

14. The method according to claim 13, wherein plural gates are provided.

15. The method according to claim 12, wherein said thermoplastic resin is a thermotropic liquid crystal resin.

* * * * *